(12) United States Patent
Lopatecki et al.

(10) Patent No.: US 10,798,465 B2
(45) Date of Patent: Oct. 6, 2020

(54) DIGITAL AUDIOVISUAL CONTENT CAMPAIGNS USING MERGED TELEVISION VIEWER INFORMATION AND ONLINE ACTIVITY INFORMATION

(71) Applicant: Adobe Inc., San Jose, CA (US)

(72) Inventors: Jason Lopatecki, Emeryville, CA (US); John Hughes, Lafayette, CA (US); Greg Collison, Oakland, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/674,440

(22) Filed: Aug. 10, 2017

(65) Prior Publication Data

US 2018/0084308 A1    Mar. 22, 2018

Related U.S. Application Data

(60) Provisional application No. 62/395,553, filed on Sep. 16, 2016.

(51) Int. Cl.

| | | |
|---|---|---|
| *H04N 21/262* | (2011.01) | |
| *H04N 21/81* | (2011.01) | |
| *H04N 21/258* | (2011.01) | |
| *H04N 21/64* | (2011.01) | |
| *H04N 21/643* | (2011.01) | |
| *H04H 60/82* | (2008.01) | |

(Continued)

(52) U.S. Cl.
CPC ....... *H04N 21/812* (2013.01); *G06Q 30/0255* (2013.01); *G06Q 30/0271* (2013.01); *H04H 60/31* (2013.01); *H04H 60/66* (2013.01); *H04H 60/82* (2013.01); *H04N 21/25883* (2013.01); *H04N 21/25891* (2013.01); *H04N 21/262* (2013.01); *H04N 21/64* (2013.01); *H04N 21/64322* (2013.01); *G06F 3/04842* (2013.01)

(58) Field of Classification Search
CPC .......... H04N 21/262; H04N 21/25883; H04N 21/25891; H04N 21/64; H04N 21/64322; G06Q 30/00; H04H 60/31; H04H 60/66; H04H 60/82
USPC ........................................ 725/34; 705/14.49
See application file for complete search history.

(56) References Cited

U.S. PATENT DOCUMENTS

| | | | |
|---|---|---|---|
| 7,979,880 B2 * | 7/2011 | Hosea .............. | H04N 21/25891 709/219 |
| 9,602,884 B1 * | 3/2017 | Eldering ................ | H04H 60/00 |

(Continued)

*Primary Examiner* — Nnenna N Ekpo
(74) *Attorney, Agent, or Firm* — Keller Jolley Preece

(57) ABSTRACT

The present disclosure relates to a content campaign system that improves the design and implementation of content campaigns. In particular, the content campaign system can receive television viewer information corresponding to television client devices and online activity information corresponding to client computing devices. Further, the content campaign system can identify a correspondence between the television viewer information and the online activity information for individual users and/or households. Based on the correspondence, the content campaign system can automatically generate targeting parameters for audiovisual content campaigns. For example, the content campaign system can recommend audiovisual content (e.g., a television advertisement) to provide to a target audience of users via a television broadcast based on the correlated television viewer information and online activity information of a particular user.

20 Claims, 9 Drawing Sheets

(51) Int. Cl.
*H04H 60/66* (2008.01)
*H04H 60/31* (2008.01)
*G06Q 30/02* (2012.01)
*G06F 3/0484* (2013.01)

(56) References Cited

U.S. PATENT DOCUMENTS

| | | | | |
|---|---|---|---|---|
| 2008/0259906 A1* | 10/2008 | Shkedi | ............... | G06Q 30/0241 |
| | | | | 370/352 |
| 2008/0276270 A1* | 11/2008 | Kotaru | ................. | H04N 21/252 |
| | | | | 725/34 |
| 2009/0299843 A1* | 12/2009 | Shkedi | ................... | G06Q 30/02 |
| | | | | 705/14.25 |
| 2011/0314495 A1* | 12/2011 | Zenor | .................... | G06Q 30/02 |
| | | | | 725/34 |
| 2013/0339991 A1* | 12/2013 | Ricci | ............... | H04N 21/44204 |
| | | | | 725/14 |
| 2014/0130092 A1* | 5/2014 | Kunisetty | .......... | H04N 21/4828 |
| | | | | 725/40 |
| 2017/0289596 A1* | 10/2017 | Krasadakis | ...... | H04N 21/25883 |

\* cited by examiner

| User ID | Household ID | Household IP Address | Third-Party Supplier | Devices ID | Devices Type | User Attributes | Behavior Signatures | Content Consumption | Advertisement Exposure |
|---|---|---|---|---|---|---|---|---|---|
| 1 | 22 | xxx.xxx.xxx.134 | TV MFG. A<br>DataSource | 875<br>321<br>089 | Television<br>Phone<br>Tablet | Female<br>18-24<br>NYC<br>Dog Owner | Faith Based Runner | Online:<br>Website XYZ<br>Television:<br>Show ABC | Campaign A, Ad B:<br>Phone-2/Television-1<br>---<br>Campaign A, Ad C:<br>Tablet-2 |
| 2 | 22 | xxx.xxx.xxx.134 | TV MFG. A<br>DataSource | 875<br>137<br>575 | Television<br>Desktop<br>Phone | Male<br>25-30<br>NYC<br>Fast Cars | Faith Based Thrill Seeker | Online:<br>Website ZZZ<br>Television:<br>Show ABC | Campaign A, Ad B:<br>Television-1<br>---<br>Campaign A, Ad D:<br>Desktop-2, Phone-1 |
| 3 | 36<br>83 | xxx.xxx.xxx.205<br>xxx.xxx.xxx.185 | TV MFG. B<br>LiveData | 831<br>321<br>587 | Television<br>Phone<br>Laptop | Male<br>35-49<br>DC Metro<br>High Income | Personal Finance Focused | Online:<br>Website BBB<br>Television:<br>Show QRS<br>Show TUV | Campaign B, Ad A:<br>Phone-2/Television-2<br>---<br>Campaign C, Ad B:<br>Phone-1, Laptop-3 |
| 4 | 56 | xxx.xxx.xxx.78 | None (Direct) | 32 | Tablet | Female<br>18-24<br>LA<br>College Student | Spanish-Speaker | | Campaign C, Ad B:<br>Tablet-2<br>---<br>Campaign D, Ad A:<br>Tablet-1 |
| 5 | 61 | xxx.xxx.xxx.21 | TV MFG. A | 852 | Television | Female<br>21-24<br>Denver | Health Conscious Runner | Television:<br>Show ABC<br>Show QRS | Campaign A, Ad B:<br>Television-2 |

Fig. 3

DIGITAL AUDIOVISUAL CONTENT CAMPAIGNS USING MERGED TELEVISION VIEWER INFORMATION AND ONLINE ACTIVITY INFORMATION

CROSS-REFERENCE TO RELATED APPLICATIONS

This application claims the benefit of and priority to U.S. Provisional Patent Application 62/395,553, filed Sep. 16, 2016. The entire contents of the foregoing patent application are hereby incorporated by reference.

BACKGROUND

Providing audiovisual content via television client devices has become an increasingly important means of conveying information to a large audience. Indeed, whether for providing entertainment, spreading a political message, selling a product, or providing public service information, portraying audiovisual content as part of linear television programming can simultaneously reach millions of viewers across the nation (or the world). Accordingly, designing and implementing campaigns for purchasing and providing audiovisual content to display via television client devices has become increasingly important.

To address this need, various computing systems have arisen for designing television programming campaigns. Although these conventional systems are able to assist in selecting audiovisual content to provide to viewers, they have a number of significant shortcomings. For example, most conventional systems rely on representative survey data from third-party analysts, such as NIELSEN® or Mediamark Research and Intelligence (i.e., MEDIAMARK RESEARCH®), to design television programming campaigns. Specifically, after television media is broadcasted via terrestrial, cable, or satellite sources to television client devices, third-party analysts conduct a survey to gather data from individual television viewers on a selected panel and report the gathered information to clients seeking to broadcast additional audiovisual content (e.g., television advertisements).

Clients seeking to provide audiovisual content such as linear television audiovisual programming, however, often grow frustrated with campaigns resulting from data (or similar survey information) from these third-party analysts. Indeed, conventional systems that utilize third-party survey data are often untimely, inaccurate, and inadequate. As an initial matter, third-party survey data is often very limited in scope. For example, third-party survey data may provide information regarding viewing habits of a large population, but fail to provide other information regarding individual viewers, such as individual viewer purchases or interests—information that is vital to designing an effective and efficient television programming campaign.

Moreover, NIELSEN® data often takes days (or weeks) to be collected and released to advertisers. Accordingly, this third-party survey data is often stale, resulting in untimely television programming campaigns. Further, because of the untimeliness of this third-party survey data, clients cannot effectively correlate the third-party survey data with other forms of data collected for viewing audiences.

As another shortcoming, this third-party survey data is often based on a relatively small sample size spread over a large geographic area (e.g., 50,000 individuals across the United States). Thus, such data is often inaccurate, too general, and unrepresentative of particular locations to allow conventional systems to accurately and specifically design granular television programming campaigns.

Furthermore, because the third-party survey data is based on a small sample size, the third-party survey data cannot be effectively combined with other data sources (e.g., online data) collected for individual users. Indeed, there is little or no correlation between individuals that provide the third-party survey data and individuals for whom other online data is collected. In addition, even if the third-party survey data were more broadly collected, conventional systems have no efficient way to correlate individual survey results with other data sources, such as online activity data, that are gathered and catalogued with respect to individual computing devices.

Some conventional systems have attempted to correlate online data with data collected from set-top-boxes to provide advertising to individual set-top-boxes. However, these conventional systems have their own problems. For example, systems that utilizes set-top-boxes experience large delays, provide poor data coverage, and rest on low-quality information. To illustrate, like survey-collected data, set-top-box data is often delayed by a few days or weeks. Also, set-top-box data is limited to content received via cable or satellite from a single (and often very small) content provider. In addition, each content provider often requires their own proprietary set-top-box devices. Further, within each region, often only a small number of television viewers use a set-top-box to obtain content from the provider. Moreover, these conventional systems often use the set-top-box data to only target set-top-box viewers (e.g., sending targeted advertisements to users via their set-top-box), rather than targeting a larger audience of television viewers.

As mentioned above, set-top-box data is also generally low-quality data. For example, set-top-box generally includes metadata about audiovisual content rather than automatic content recognition data. For instance, set-top-box data does not include advertisements or other creative information. Along similar lines, set-top-box data fails to indicate all audiovisual content that is displayed on a television client device (e.g., set-top-box data does not include audiovisual content received from other auxiliary devices). Accordingly, set-top-box data is generally incomplete and does not accurately indicate audiovisual content being displayed on a television client device. Thus, conventional systems that utilize set-top-box data still suffer from a number of problems.

As a result of these shortcomings, conventional systems are not only inaccurate, but computationally inefficient. Indeed, conventional systems can utilize significant processing and memory requirements analyzing survey data that is inaccurate, untimely, and inadequate in an effort to generate accurate and useful television programming campaigns. Thus, conventional systems often expend significant computer processing and storage resources in attempting to design campaigns utilizing third-party survey data.

Accordingly, these along with additional problems and issues exist with regard to conventional media providers.

BRIEF SUMMARY

One or more embodiments of the present disclosure include systems and methods that improve the design and implementation of audiovisual and digital content campaigns by combining and utilizing online activity information from computing devices and television viewer information from television client devices of individual users. In particular, the disclosed systems and methods can evaluate television viewer information collected from television client devices (e.g., information gathered directly from television client devices via television manufacturers as opposed to from set-top-box devices) and online activity information collected from computing devices and determine common data features to identify users that are included in both the online activity information and the television viewer information. Thus, even though television viewer information (e.g., information collected directly from a television client device) and online activity information is generally not identified by individual user, the disclosed systems and methods can identify correlations between online activity information from computing devices and television viewer information from television devices applicable to individual users and then utilize the online activity information and television viewer information to design audiovisual content campaigns. As one example, the disclosed systems and methods can identify internet protocol (IP) addresses from a set of television client devices and audiovisual content displayed by the television client devices, identify IP addresses from online activity information from a set client computing devices and generate an amalgamated dataset of individual users, which enables the systems and methods to effectively and efficiently select linear television advertising to serve to individual users.

Specifically, the disclosed systems and methods can correlate television viewer information and online activity information that is associated with the same user. Based on the identified users and their corresponding online activity information and television viewer information, the disclosed systems and methods can determine a set of targeting parameters for an audiovisual content campaign that accurately represents one or more individual users. In some embodiments, the disclosed systems and methods use the targeting parameters to recommend audiovisual content (e.g., a television advertisement) and/or a target audience of users (e.g., users viewing a particular show, network, or daypart) to serve to individual users or groups of users via linear television programming.

To illustrate, in one or more embodiments, the disclosed systems and methods determine a correspondence between television viewer information and online activity information for individual users based on IP addresses. As briefly mentioned above, the disclosed systems and methods can compare the IP addresses from the television viewer information with the IP addresses of the online activity information to identify matching IP addresses (e.g., a television client device and a client computing device having the same IP address). For instance, the disclosed systems and methods can determine a correspondence between the IP address of a user's television device and the IP address of the user's laptop, tablet, or phone. This IP address matching can occur for client devices associated with a user when each of the user's client devices connects to the Internet using the same network gateway device (e.g., modem, switch, etc.) and/or Internet Service Provider (ISP). By detecting a matching IP address among multiple client devices, the systems and methods can quickly and accurately combine the information from the different information sets for multiple users to form a composite database of both television viewer information and online activity information on a per user level and for a multitude of users. The disclosed systems and methods can then utilize both online activity information and television viewer information to design and implement an audiovisual content campaign, such as a linear television programming campaign.

By determining online activity information and television viewer information reflecting audiovisual content displayed on and collected by a television client device specific to individual users, the disclosed systems and methods can resolve many of the shortcomings of conventional systems. For example, the disclosed systems and methods can identify and update television viewer information and online activity information for individual users as well as generate audiovisual content campaign parameters based on timely, up-to-date information. For instance, unlike conventional survey data or set-top-box data, the disclosed systems and methods can identify information from television client devices and obtain television viewer information at the same speed or nearly the same speed as client computing devices provide online activity information. Further, the disclosed systems and methods can obtain and utilize television viewer information regarding all audiovisual content provided to television client devices, including creatives, such as advertisements. In addition, the disclosed systems and methods are not limited to a particular content provider or region, but can obtain television viewer information and provide audiovisual content with regard to a national, or even global, audience. Moreover, by pairing the television viewer information of users worldwide with the online activity information of the same users, the disclosed systems and methods can generate specific audiovisual content campaigns (e.g., linear television audiovisual content) based on granular data of individual users with respect to particular locations, demographics, or other user features. Furthermore, the disclosed systems and methods can generate campaign parameters based on both television viewer information and online activity information, including programs or advertisements viewed by users, purchases, or other online activities of users. In addition, the disclosed systems and methods can utilize television viewer information and online activity information to more efficiently design campaign parameters for linear television campaigns.

These and additional features and advantages of one or more embodiments of the present disclosure are outlined in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

FIG. 3 illustrates an example composite database in accordance with one or more embodiments.

DETAILED DESCRIPTION

Figure 1:
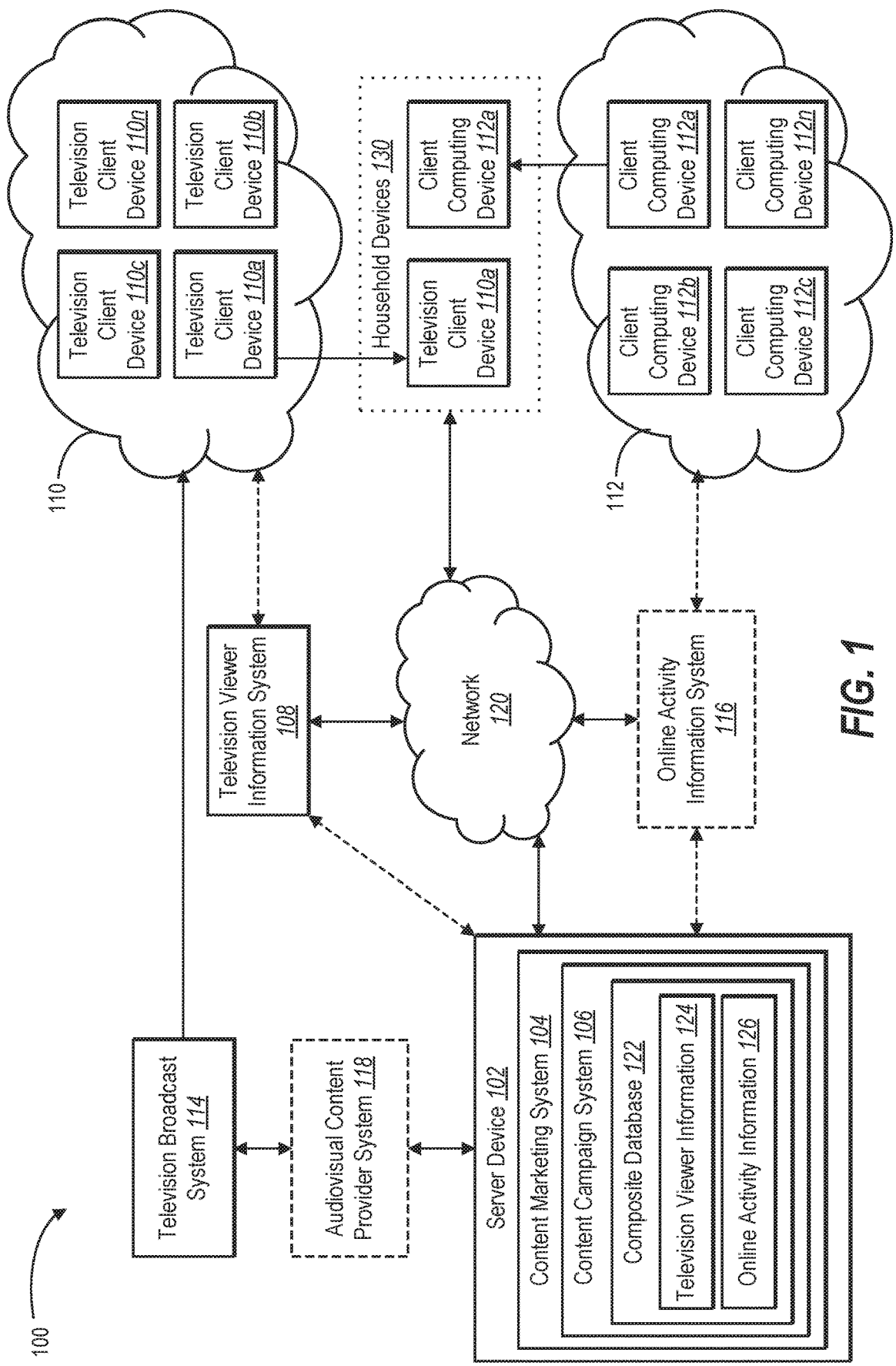
FIG. 1 illustrates a block diagram of an environment in which a content campaign system can operate in accordance with one or more embodiments.

One or more embodiments of the present disclosure include a content campaign system that improves the selection of linear television programming based on generating up-to-date and accurate correlations between television client devices and client computing devices. For example, in one or more embodiments, the content campaign system receives television viewer information corresponding to television client devices (e.g., television viewer information gathered directly from television client devices and not set-top-box or other similar devices) and online activity information corresponding to client computing devices. The content campaign system can identify a correspondence between the television viewer information and the online activity information for a number of individual users or households. In particular, the content campaign system can by comparing common data features, such as IP addresses, from the television viewer information and the online activity information to identify a matching correspondence.

Further, upon identifying the correspondence, the content campaign system can analyze the television viewer information and the online activity information for a group of users and automatically generate targeting parameters for audiovisual content campaigns (e.g., television campaigns). For example, in one or more embodiments, the content campaign system recommends audiovisual content (e.g., a television advertisement) to provide to a target audience of users via a television broadcast (rather than targeting individual users on a per device basis) based on television viewer information and online activity information of a particular user. In particular, in these embodiments, the content campaign system can recommend specific linear audiovisual television content to provide to the target audience based on the identified correspondences for one or more identified users in the group.

To illustrate, in one or more embodiments, the content campaign system receives television viewer information indicating broadcasted audiovisual content displayed on and collected by television client devices associated with the first set of users and global internet protocol (IP) addresses (or simply "IP addresses") corresponding to the television client devices. Moreover, the content campaign system can determine online activity information of a second set of users that indicates IP addresses corresponding to client devices associated with the second set of users. Based on the IP addresses indicated by the television viewer information and the IP addresses indicated by the online activity information, the content campaign system can identify a correspondence between online activity information of a first user and television viewer information of the first user. Moreover, based on the online activity information and the television viewer information of the first user, the content campaign system can correlate a complete set of user data and generate targeting parameters for a linear television audiovisual content campaign for providing audiovisual content for display to multiple television client devices via linear television programming.

As just mentioned, in one or more embodiments, the content campaign system receives television viewer information related to a first set of users. The content campaign system can receive television viewer information either directly or indirectly from television client devices associated with viewing users. For instance, the content campaign system can obtain television viewer information including television programs played via a television display, television advertisements viewed via a television display, time and duration of audiovisual content portrayed on a television display, and/or IP addresses of television client devices. Often, the content campaign system can receive television viewer information within hours, minutes (e.g., 1, 2, 5, 10, or 15), or even seconds of audiovisual content being portrayed to television client devices. Moreover, by receiving television viewer information from television client devices, the content campaign system can collect television viewer information associated with thousands or millions of viewers in real-time or near-real time.

As also mentioned, the content campaign system can also receive or determine online activity information related to a second set of users. For example, the content campaign system can monitor online activities by individual users utilizing browser cookies or tracking pixels. To illustrate, the content campaign system can determine browsing behavior and history, searches, online purchases, as well as the IP address of the client computing device. For example, the content campaign system generates and maintains a composite database that includes online activity information for a large dataset of user.

The content campaign system can analyze online activity information and television viewer information to determine a correspondence between the online activity information and the television viewer information for individual users and/or households. For example, in one or more embodiments, the content campaign system determines a correspondence based on a number of IP addresses of the television viewer information for the first set of users matching IP addresses of the online activity information for the second set of users. To illustrate, the content campaign system can identify an IP address of a television client device from the television viewer information that is the same as an IP address of a client computing device from the online activity information indicating that television viewer information and online activity information belonging to the same user or household. Upon determining a matching IP address between a television client device and a client computing device, in one or more embodiments, the content campaign system correlates the corresponding television viewer information with the corresponding online activity information for that user as well as for a number of users for which a IP correspondence was identified. For example, the content campaign system can merge the television viewer information and the online activity information for the user into a composite database.

Upon identifying a correspondence between online activity information and television viewer information for individual users and/or households, the content campaign system can also analyze the online activity information and television viewer information to generate targeting parameters for an audiovisual content campaign. In particular, the content campaign system can generate and/or implement targeting parameters for providing audiovisual content to television client devices based on user correlations between online activity information and television viewer information as found within the composite database. By way of example, the content campaign system can generate targeting parameters that include one or more recommended items of audiovisual content (e.g., a television advertisement) to provide to a target audience of users via linear television programming and/or information regarding which users to include in the target audience who are likely to view the linear television programming.

In some embodiments, the content campaign system identifies a correspondence between online product data and television product data for a user based on aligning the television viewer information with the online activity information. For instance, the content campaign system can determine that a television client device of a user portrayed a television advertisement for a product. The content campaign system can also determine that the user purchased the product online via a client computing device of the user. Then, based on the identified correspondence between the television product data (e.g., the determination that the television client device portrayed the advertisement for the product) and the online product data (e.g., the determination that the user purchased the product online), the content campaign system can generate targeting parameters for an audiovisual content campaign, such as recommending particular audiovisual content related to the product to provide via linear television programming to comparable users.

In addition, the content campaign system can also execute an audiovisual content campaign based on a correspondence between online activity information and television viewer information. For example, the content campaign system can determine specific audiovisual content to provide to a target audience as well as when (e.g., time slots or linear television programs for broadcasting the audiovisual content where viewership of the target audience is dense/high) and where (e.g., what networks, stations, or geographic locations) to provide the specific audiovisual content. The content campaign system can also automatically provide the determined audiovisual content to a television broadcaster to be displayed at the determined time and/or on the determined linear television program.

As mentioned above, the content campaign system provides numerous benefits over conventional systems. As one example, the content campaign system can generate and implement more accurate and relevant targeting parameters and audiovisual content campaigns. In particular, the content campaign system can correlate online activity information from computing devices and television viewer information from television client devices for individual users across a desired population. Moreover, by identifying television viewer information and corresponding online activity information for individual users, the content campaign system can generate targeting parameters and audiovisual content campaigns that accurately reflect combined patterns of television viewership and online activity (e.g., online data segments) for particular locations, demographics, or viewerships. Thus, the content campaign system can generate targeting parameters based on a more complete, holistic view of that reflects both user interactions with television client devices and computing client devices. Accordingly, the content campaign system can run more efficient and accurate audiovisual content campaigns directed to target audiences most interested in a particular product or service via linear television programming.

Moreover, the content campaign system can generate targeting parameters and audiovisual content campaigns based on timely, up-to-date information. As mentioned above, conventional systems often require days or weeks to obtain third-party survey data or set-top-box data, which results in the information being stale and untimely. In contrast, the content campaign system can receive television viewer information within hours, minutes, or seconds of audiovisual content being portrayed on television client devices. Accordingly, the content campaign system can use fresh television viewer information, in connection with up-to-date online activity information, to generate timely targeting parameters for an audiovisual content campaign. Moreover, television client devices can provide television viewer information that is more complete and accurate than conventional systems could previously obtain via a survey. In addition, television client devices provide much larger sets of television viewer information (e.g., large sample sizes) in a much shorter time period.

Further, the content campaign system can generate more detailed and targeted audiovisual content campaigns based on more complete and accurate datasets. Thus, in contrast to campaigns generated from broad samples of third-party survey data, the content campaign system can generate specific audiovisual content campaigns based on granular data of individual users with respect to particular locations, demographics, or other user features. As mentioned above, using the television viewer information of users in connection with the online activity information of the same users, the content campaign system can identify attributes, characteristics, and behaviors specific to a particular group of users (e.g., a target audience).

Also, in one or more embodiments, the content campaign system generates efficient, specific content campaigns across a variety of media channels. For example, the content campaign system can generate targeting parameters for a content campaign for displaying content on television client devices (e.g., via linear television programming), client computing devices (e.g., via online advertisements), or both (e.g., via a combined coordinated media channel campaign).

As an additional benefit, the content campaign system efficiently and accurately generates design targeting parameters for an audiovisual content campaign while, at the same time, reducing computing resources. In particular, as a result of having more accurate, timely data regarding individual users, the content campaign system can generate and design more accurate campaigns with less processing and memory requirements. In some cases, through employing timely, accurate, and relevant television viewer information and online activity information, the content campaign system more quickly determines valuable targeting parameters for an audiovisual content campaign.

Furthermore, the content campaign system provides a number of advantages over conventional systems that rely on set-top-box data specifically. For example, by employing television viewer information received from television client devices (e.g., audiovisual content shown on a television client device display and collected by the television client device), the content campaign system improves the accuracy of the television viewer information by considering all audiovisual content shown on a television client. For instance, unlike set-top-box data, television viewer information includes advertisement and other creative information, such as the advertisements with which a user engages. Moreover, the content campaign system can obtain and utilize television viewer information displayed on a television client device that originates from any auxiliary device.

Further, while set-top-box devices are specific to individual content providers within individual regions, television client devices are nearly universal. Accordingly, the content campaign system can collect television viewer information from a much larger audience segment. Further, the content campaign system can obtain and utilize television viewer information that reflects a larger number of users, over wider geographic regions. For instance, rather than using a set-top-box for a single user to serve an advertisement via the set-top-box, the content campaign system can receive television viewer information regarding a wide segment of the population and then select and provide audiovisual content via television broadcasts for a local, national, or global audience.

Additional advantages and benefits of the content campaign system will become apparent in view of the below description. In particular, one or more embodiments of the content campaign system will be described below with reference to one or more figures. In addition, the following definitions of terms will be used to describe one or more features of the content campaign system.

Referring now to the figures, FIG. 1 illustrates a block diagram of an example environment 100 in which a content campaign system operates. In particular, the example environment 100 shows a number of systems and devices including a server device 102 that houses a content marketing system 104 and a content campaign system 106, a television viewer information system 108, a set of television client devices 110, a set of client computing devices 112, and a television broadcasting system 114. In some embodiments, as optionally shown, the example environment 100 also includes an online activity information system 116 and an audiovisual content provider system 118.

As a note, each of the devices (e.g., the server device 102, the set of television client devices 110, and the set of client computing devices 112) can operate on one or more computing devices, such as the computing device described below with respect to FIG. 9. For example, the server device 102 operates across various server devices. Additionally, while not shown for simplicity, each of the systems (e.g., the television viewer information system 108, the television broadcast system 114, the online activity information system 116, and the audiovisual content provider system 118) can operate on one or more computing devices, such as the computing device described below with respect to FIG. 9.

Each of the systems and devices shown in the example environment 100 can communicate via a network 120. The network 120 represents an intranet and/or an internet network. For simplicity, the example environment 100 does not display a connection between each system or device with the network 120, however, one will appreciate that each system or device is capable of connecting to and communicating via the network 120. For example, while the set of television client devices 110 shows a direct connection to the television viewer information system 108, the set of television client devices 110 can connect to the television viewer information system 108 via the network 120. Additional detail regarding the network 120 is provided below with regard to FIG. 9.

As mentioned above, the content campaign system can generate and/or implement an audiovisual content campaign based on online activity information and television viewer information. In particular, the content campaign system can generate an audiovisual within the environment 100. By way of example, in one or more embodiments, the content campaign system 106 receives television viewer information from the set of television client devices 110. Specifically, the television broadcast system 114 provides audiovisual content to television client devices 110a-n within the set of television client devices 110, which display and collect the broadcast audiovisual content (e.g., by monitoring or capturing images portrayed via a display of the television client device 110). The television client devices 110a-n then report (or the television viewer information system 108 otherwise collects) television viewer information about the audiovisual content to the television viewer information system 108 and the television viewer information system 108 provides the television viewer information to the content campaign system 106 within the content marketing system 104.

In one or more embodiments, the television viewer information is gathered from a television client device using automatic content recognition. For example, the television client device analyzes (or provides to another device, such as the television viewer information system 108, to analyze) an image and/or audio being displayed on the television client device to identify the audiovisual content (e.g., a television show or advertisement) being displayed. Upon identifying the audiovisual content, the television client device or such as the television viewer information system 108 can look up additional data associated with the identified audiovisual content. In this manner, the television viewer information can include, for example, the audiovisual content displayed, time displayed, other audiovisual content associated with the identified audiovisual content (e.g., if the identified audiovisual content is an advertisement, which shows bookended the advertisement), and/or the geographic location displayed, the network/station/channel on which the identified content is displayed.

Additionally, the content campaign system 106 receives online activity information from the set of client computing devices 112. Specifically, client computing devices 112a-n within the set of client computing devices 112 provide online digital content for display to users. In addition, the client computing devices 112a-n provide (or the online activity information system 116 otherwise detects) online activity information indicating user online interactions to the online activity information system 116 and the online activity information system 116 provides the online activity information to the content campaign system 106. Alternatively, the content campaign system 106 receives online activity information directly from one or more of the client computing devices 112a-n or from the content marketing system 104.

For reference, as used herein, the term "content campaign" refers to providing content to one or more users via one or more communication media. In particular, the term "content campaign" includes an operation for providing content for a client (e.g., an advertiser) to a target audience of users via television client devices and/or client computing devices over time. For example, a content campaign can include providing content focused on a product or product category to a variety of different clients over a period of time. In addition, a content campaign can include sub-campaigns, such as an audiovisual television campaign related to providing audiovisual content to television client devices or an online campaign related to providing digital content to client computing device via the Internet. Further, a content campaign can include advertisement campaigns related to serving advertisement content via one or more device types (e.g., television client device and/or client computing device).

As used herein, the term "content" refers to digital data (e.g., digital data that may be transmitted over a wired or wireless network). In particular, "content" includes images, video, and/or audio data. Moreover, content includes audiovisual content. In addition, content includes both digital content provided to client computing devices and audiovisual content provided to television client devices, as further described below.

The terms "audiovisual content" or "audiovisual television content" as used herein refers to content that includes either visual elements, audio elements, or both. In particular, the terms "audiovisual content" or "audiovisual television content" include images or videos shown (or to be shown) to one or more television client devices. For example, audiovisual content can include television programs, shows, commercials, and/or advertisements. In addition, the term "broadcasted audiovisual content" as used herein refers to audiovisual content that was previously provided to one or more television client devices. In some embodiments, audiovisual content includes content provided to client computing devices (e.g., client computing devices that display linear television programming).

The term "television client device," as used herein, refers to a television device that displays audiovisual content. In particular, the term "television client device" refers to a dedicated television that utilizes a tuner for receiving and decoding broadcast signals. Thus, a television client device includes a device that receives and displays audiovisual content via a broadcast signal. In addition, a television client device can receive and display audiovisual content from separate auxiliary devices that are not part of the television client device (e.g., DVD/video players, set-top-boxes, over-the-top content devices, video game consoles, streaming devices, or client computing devices). In some embodiments, an auxiliary device is built in to (or affixed to) a television client device, however, the auxiliary device provides functionality that is separate from a television client device, such as receiving and routing content to the television client device, and thus, is not part of a television client device as used herein.

In one or more embodiments, a television client devices includes devices that receive and decode television signals (e.g., via cable, satellite, or terrestrial sources). In alternative embodiments, as mentioned above, a television client device decodes audiovisual content from auxiliary devices, such as a separate over-the-top device that streams audiovisual content to the television client device. Additionally, a television client device can include a device identifier that identifies a particular television client device from other television client devices. In addition, a television client device can establish a network connection having an assigned IP address. In this manner, a television client device can provide television viewer information via the network connection, as described herein.

As used herein, the term "television viewer information" refers to data associated with a television client device. In particular, the term "television viewer information" includes information provided by a television client device associated with one or more users. For example, television viewer information includes the global IP address and/or device identifier of a television client device, the television programs and television advertisements played on the television client device, the time of operation, the duration of audiovisual content played on the television client device, current and modified settings of the television client device, and/or the applications accessed on the television client device.

The term "television program" as used here refers to audiovisual content that is intended to attract viewership from one or more users. In particular, a television program includes audiovisual content that is not an advertisement or commercial provided via a television client device. For example, the term "television program" includes a television show, a television series, a television special, or a television movie.

In addition, a television program is often included as part of during a linear television programming schedule. As used herein, the terms "linear television programming schedule," "linear television schedule," or "linear schedule" refer to a sequence of audiovisual content pre-programmed/scheduled to be provided at a particular time (e.g., by a television broadcast system to television client devices). Often, a linear television programming schedule is specific to one or more geographical regions.

As mentioned above, the term "digital content" as used herein refers to digital data that includes either visual elements, audio elements, or both. In particular, the term "digital content" includes an image or video shown (or to be shown) to one or more client computing devices. For example, digital content includes content provided via web page, audio stream, video stream, or another online medium.

The term "online activity information," as used herein refers to data associated with a client computing device. In particular, the term "online activity information" includes online activities, behaviors, and patterns of users as the users interact with the Internet via client computing devices. For example, television viewer information can include a user's browsing history, online clicks, digital content impressions, browsing behavior, online product purchases, session information, search history and results, website data, cookie data, and/or social media interactions. Additional examples include data associated with an application ("app") such as an app download, app installation, in-app interactions, in-app purchases, location data from the client computing device on which the app is installed, other information associated with the client computing device, and/or other apps with which the app interacts. Further, online activity information can include client computing device-specific information, such as the IP address, device identifier (e.g., MAC address and/or model-serial number), hardware specifications, etc.

In one or more embodiments, the content campaign system 106 identifies correspondences between the received television viewer information and online activity information. As in shown in FIG. 1, the content campaign system 106 determines a correspondence between a first television client device 110a from the set of television client devices 110 and a first client computing device 112a from the set of client computing devices 112. In particular, the content campaign system 106 identifies that the first television client device 110a and the first client computing device 112a are associated with a user and/or a household. As shown, household devices 130 associated with a user include the first television client device 110a and the first client computing device 112a.

In some embodiments, the content campaign system 106 determines a correspondence by matching IP addresses between a television client device and a client computing device, as described below. In general, each client device in a household (i.e., household devices 130) uses the household's global IP address to communication with systems and devices located outside of the local household network. In particular, the household uses an Internet gateway device (e.g., a modem, switch, etc.) having an IP address (e.g., IP version 4 or IPv4) assigned by an ISP which uniquely identifies the household's location on the Internet such that the household can send and receive data via the Internet (e.g., the network 120). Once data from the Internet arrives at a household, network devices (e.g., switches and routers)

within the household network may direct the data to a particular household device. However, even if two household devices 130 have different local household network addresses, the two household devices 130 share the same global household IP address (or simply IP address).

Based on identifying matching IP addresses (and/or another common data feature), the content campaign system 106 determines additional correspondence between other television client devices 110b-n and client computing devices 112b-n. For each correspondence, the content campaign system 106 combines television viewer information with the corresponding online activity information. Then, based on the combined information, the content campaign system 106 generates targeting parameters. As one of many examples, targeting parameters include determining audiovisual content and/or a target audience of users for the audiovisual content.

In addition, in one or more embodiments, the content campaign system 106 automatically implements the generated targeting parameters in a current or future content campaign. Alternatively, the content campaign system 106 can generate the targeting parameters and provide the targeting parameters to a user (e.g., an administrator of one or more content campaigns) to approve and/or implement the targeting parameters in a content campaign.

As used herein, the term "targeting parameters" refers to data used to select and provide audiovisual content to users. In particular, the term "targeting parameters" includes variables utilized to select an advertising slot or impression opportunity in an audiovisual content campaign. For example, targeting parameters includes one or more user characteristics, attributes, or indicators, such as a target age or gender. Similarly, targeting parameters include a budget amount, time of day, or location for providing audiovisual content. Targeting parameters can include one or more recommended audiovisual content items (e.g., audiovisual advertisements, promotions, or offerings) to provide to a target audience of users and/or information regarding which users to include in the target audience. Additional information regarding targeting parameters is provided below.

The term "target audience" refers to a group of more or more users at which an audiovisual content campaign (or a portion thereof) is directed. In particular, the term "target audience" refers to a group of users that are associated with a targeting parameter. For example, a target audience includes an intended group of users in a geographical region that view a particular genre of television programs. For example, a target audience includes a group of users that views audiovisual content during a specific show, on a specific network, or at a specific daypart (e.g., time of day). Thus, a target audience can be identified or defined by a show, a network, or a daypart.

With regard to the embodiment of FIG. 1, the content campaign system 106 provides the targeting parameters and/or audiovisual content to the television broadcast system 114 to broadcast the audiovisual content to television client devices (e.g., as part of linear television programming). Depending on the target audience, the television client devices can include one or more television client devices in the set of television client devices 110 and/or other television client devices (e.g., television client devices located in a different region or location). If, however, the television broadcast system 114 does broadcast the audiovisual content to a television client device in the set of television client devices 110, the television viewer information system 108 can determine and report if the television client device displayed the audiovisual content as desired.

As mentioned above, the television viewer information system 108 can provide the television viewer information 124 to the content campaign system 106 from the television client devices 110a-n. For example, in one or more embodiments, users associated with the television client devices 110a-n elect (e.g., opt-in) to report their television viewer information to the television viewer information system 108. Indeed, in one or more embodiments, the television viewer information system 108 is a first-party source, such as a television manufacturer that receives television viewer information directly from the television client devices 110a-n. In alternative embodiments, the television viewer information system is a third-party source that provides the television viewer information 124 to the content campaign system 106. Regardless of whether the television viewer information system 108 is a first-party or third-party source, the television viewer information system 108 can provide television viewer information to the content campaign system 106 shortly after (e.g., seconds, minutes, or hours) receiving the television viewer information from the set of television client devices 110.

As shown in FIG. 1, the content campaign system 106 resides within a content marketing system 104. The content marketing system 104 can perform a variety of functions. For example, in one or more embodiments, the content marketing system 104 facilitates various content marketing campaigns across multiple media channels. Indeed, the content marketing system 104 can facilitate audiovisual content campaigns, online digital content campaigns, mobile digital content campaigns as well as other campaigns. In some embodiments, the content marketing system 104 employs the content campaign system 106 to facilitate the various content campaigns.

In various embodiments, the content marketing system 104 analyzes user information to determine content to serve to a particular target audience of users and/or a particular media channel. In one example, the content marketing system 104 analyzes online activity within a collection of user information to identify a particular advertisement offer to serve to specific users via a particular social media application. In another example, the content marketing system 104 determines to offer a particular product to a target audience that is unfamiliar/not yet exposed to the product.

As shown in FIG. 1, the content campaign system 106 includes a composite database 122. The composite database 122 maintains a collection of user information in connection with implementing campaigns. For example, the collection may include demographic information, geographic information, client device information, behaviors, habits, online activity, social media activity, and/or product preferences.

Further, as shown, the composite database 122 includes television viewer information 124 and online activity information 126 as well as correspondences between the two information sets. As mentioned above, the television viewer information can include the global IP address and/or device identifier of a television client device as well as the television programs and television advertisements played on the television client device. In addition, in one or more embodiments, the television viewer information 124 includes television information collected from multiple television client devices, such as the television client devices within the set of television client devices 110.

The online activity information system 116 can provide online activity information 126 to the content campaign system 106. In general, the online activity information system 116 collects online activity information 126 from the client computing devices 112a-n, such as from users associated with the client computing devices 112a-n that elect to have their online activity reported. In some embodiments, the online activity information system 116 is a third-party system that collects and provides online activity information 126 to the content campaign system 106.

In some embodiments, the content campaign system 106 obtains online activity information from client computing devices. However, the content campaign system 106 can also obtain the online activity information from one or more remote servers. Specifically, online activity can include a user of a client computing device interacting with content provided by one or more server devices. Accordingly, the one or more server devices can also provide the online activity information to a content marketing system or the content campaign system 106.

As shown in FIG. 1, in one or more embodiments, the online activity information system 116 is an independent computing system. For example, the online activity information system 116 includes a server device providing content to (and receiving information from) client computing devices 112a-n. In particular, the online activity information system 116 maintains a record of user interactions via the client computing devices 112a-n. In additional, or alternative embodiments, the online activity information system 116 is implemented as part of the content marketing system 104 and/or the content campaign system 106. For example, the content marketing system 104 monitors and maintains online activity information 126 provided by the client computing devices 112a-n.

Likewise, the audiovisual content provider system 118 can operate within the content marketing system 104 and/or the content campaign system 106. Alternatively, the audiovisual content provider system 118 can operate apart from the content marketing system 104. For example, as mentioned above, the content campaign system 106 uses targeting parameters to determine audiovisual content to provide to a target audience of users. In other embodiments, the content campaign system 106 provides targeting parameters to the audiovisual content provider system 118, which uses the targeting parameters to determine audiovisual content to provide to the television broadcast system 114 for display to a targeted group of television client devices.

As mentioned above, the television broadcast system 114 broadcasts audiovisual content to television client devices such as the television client devices 110a-n in the set of television client devices 110. In general, the television broadcast system 114 provides linear (e.g., pre-programmed/scheduled) audiovisual content to television client devices. The television broadcast system 114 can broadcast audiovisual content via wired or wireless means, such as via a terrestrial, cable, satellite, Internet, Wi-Fi, or another signal.

As just mentioned, the television broadcast system 114 broadcasts linear audiovisual content, which includes television programs and advertisements selected ahead-of-time for a particular geographical region. Due to restrictions and regulations, television broadcast system 114 often cannot broadcast audiovisual content, such as advertisements, without vetting and approving the audiovisual content. However, once audiovisual content is approved, the television broadcast system 114 can offer future time-slots, stations, networks, and/or shows to the content marketing system 104/content campaign system 106 and/or the audiovisual content provider system 118 such that the audiovisual content can be broadcasted to a particular geographic location.

As illustrated, in one or more embodiments, the server device 102 can include all, or a portion of, the content campaign system 106. In particular, the content campaign system 106 can comprise an application running on the server device 102 or a portion of a software application that can be downloaded from the server device 102. For example, the content campaign system 106 can include a web hosting application that allows client devices (e.g., client devices corresponding to various advertisers) to interact with content hosted at the server device 102. To illustrate, in one or more embodiments of the exemplary environment 100, one or more advertising client devices can access a webpage supported by the server device 102 to interact with the content campaign system 106 (e.g., select targeting providers, provide content, select budgets, etc.). In particular, the advertising client devices can run an application to allow an advertiser to access, view, and/or interact with a webpage or website hosted at the server device 102.

Although FIG. 1 illustrates a particular arrangement of the television client devices 110a-n, the client computing devices 112a-n, the television broadcast system 114, the audiovisual content provider system 118, the television viewer information system 108, the online activity information system 116, and the server device 102, various additional arrangements are possible. For example, while FIG. 1 illustrates the household devices 130 communicating with the server device 102, in one or more embodiments a single client device may communicate directly with the server device 102, bypassing the network 120. Moreover, as just discussed, additional advertising client devices may also be included in the environment 100 for interacting with the content campaign system 106 in generating content campaigns.

Similarly, although the content campaign system 106 is depicted as being implemented by the server device 102, the content campaign system 106 may be implemented across various computing devices. For example, the content campaign system 106 may be implemented (in whole or in part) by the television broadcast system 114, the audiovisual content provider system 118, the online activity information system 116, and/or the household devices 130.

As used herein, the terms "product" and "products" may refer to any good (tangible or intangible), service, article, or other marketable object or offering. Further, the term "product" can refer to a single product or to a grouping of products. The term "product data" refers to any data or information associated with a product or product category. For example, product data may include, but is not limited to, recommendations, ratings, reviews, comments, survey results, statistics, purchases, near-purchases, or any other information/data related to a product or product category. For example, product data can include data indicating that a user has added a product to a virtual shopping cart. The term "product category" may refer to any grouping, type, class, division, subdivision, set, kind, or classification of products.

The term "television product data" refers to product data provided via a television client device. In particular, television product data includes television viewer information that is associated with a product. For example, television product data includes a television advertisement portrayed via a television client device for a product to a user. Similarly, the term "online product data" refers to product data provided via a client computing device. In particular, television product data includes online activity information that is associated with a product. For example, online product data includes conversion information corresponding to a product by a user.

As used herein, the term "conversion information" refers to data associated with a user performing a desired action. In particular, "conversion information" include data indicating user interaction with a product or a website. For example, the term "conversion information" includes data indicating a user purchasing a product, visiting a website, clicking an advertisement, or viewing digital content. Thus, conversion information also includes when a user views or otherwise interacts with audiovisual content, either via a client computing device or a television client device.

Figure 2:
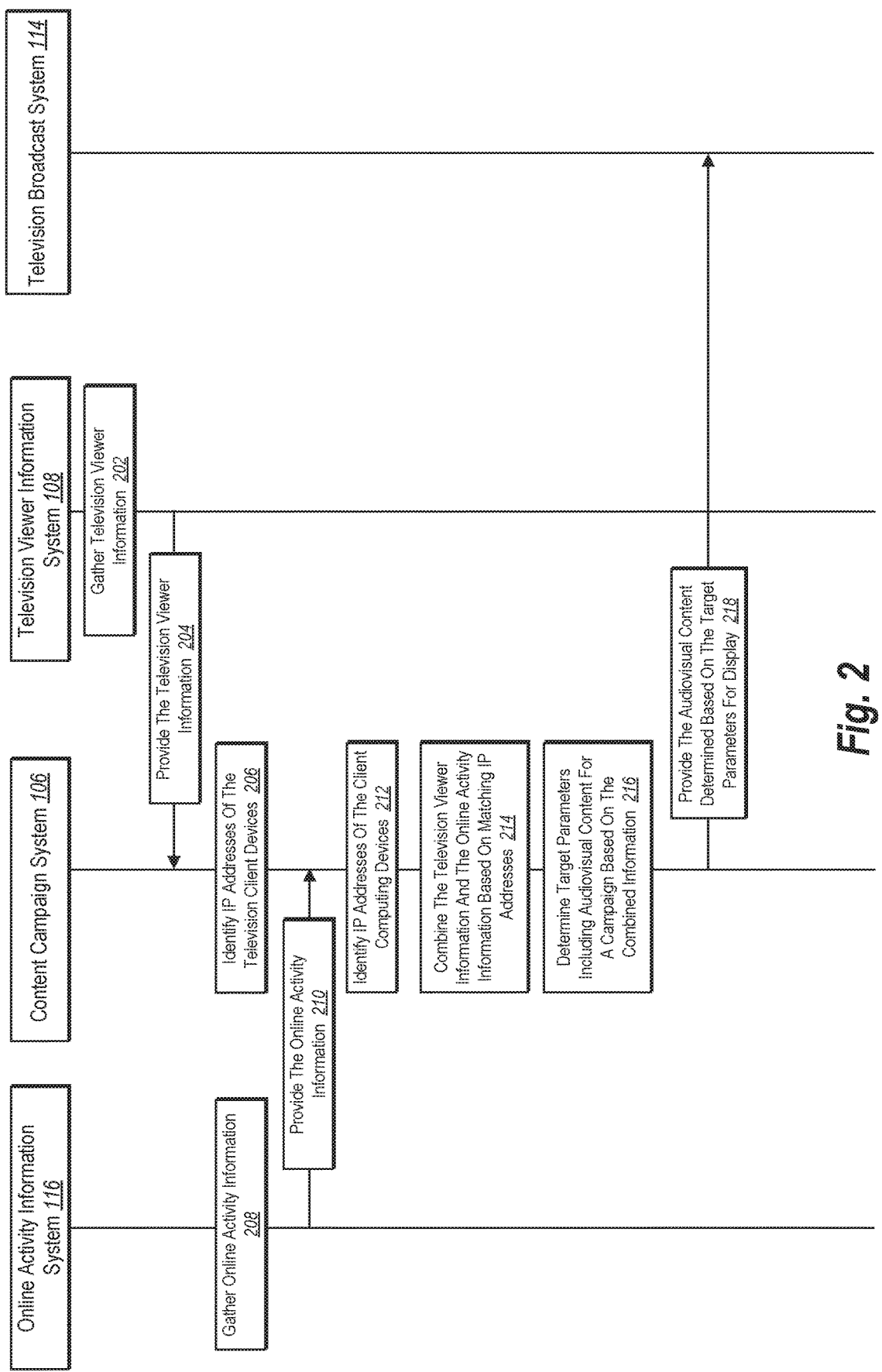
FIG. 2 illustrates a sequence diagram of the content campaign system determining targeting parameters for providing audiovisual content for an audiovisual content campaign in accordance with one or more embodiments.

Turning now to FIG. 2, additional detail will be provided regarding generating targeting parameters based on online activity information and television viewer information, in accordance with one or more embodiments. In particular, FIG. 2 shows a sequence diagram of the content campaign system 106 determining targeting parameters for providing audiovisual content for an audiovisual content campaign. As shown, FIG. 2 includes a content campaign system 106, a television viewer information system 108, an online activity information system 116, and a television broadcast system 114. Each of the systems shown in FIG. 2 can represent example embodiments of corresponding systems described with respect to FIG. 1. For example, while not shown, the content campaign system 106 in FIG. 2 can reside within the content marketing system 104 and server device 102 previously described. Similarly, although shown as separate systems, in one or more embodiments, the online activity information system 116 and the television viewer information system 108 may be implemented as part of the content campaign system 106, as described above.

As shown in FIG. 2, the television viewer information system 108 gathers 202 television viewer information. For example, the television viewer information system 108 receives television viewer information from a set of television client devices that includes a content feed and an advertisement feed. In addition, the television viewer information system 108 receives the IP address from each television client device providing television viewer information. In some cases, the television viewer information system 108 also receives the device identifier of each television client device. For instance, a television client device includes its device identifier within each piece of television viewer information the television client device provides to the television viewer information system 108.

As also shown, the television viewer information system 108 provides 204 the television viewer information to the content campaign system 106. In one or more embodiments, the television viewer information system 108 (receives and) provides multiple feeds of television viewer information to the content campaign system 106. For example, the television viewer information system 108 provides one feed that includes programs displayed on the set of television client devices as well as corresponding data (e.g., a program identifier, a television channel/station, network, a time, a duration, a geolocation, scheduling data, whether the show is time-shifted, and/or a timestamp(s)). In addition, the television viewer information system 108 provides a second feed that indicates advertisements displayed on each television client device as well as corresponding data (e.g., an advertisement identifier, the time aired, whether the advertisement was played or skipped by a user, the program(s) playing before/after the advertisement aired, and/or a timestamp(s)). In alternative or additional embodiments, the television viewer information system 108 provides the television viewer information 124 in a combined feed for each television client device or for a group of television client devices. For instance, the combined feed provides a viewer density score (e.g., indicating a popularity percent) for each displayed television program and/or advertisement.

Further, the television viewer information system 108 can provide the television viewer information to the content campaign system 106 at intervals or continuously. In one or more embodiments, the television viewer information system provides the television viewer information continuously (e.g., in real-time) as information is received from the television client devices. In some instances, the television viewer information system 108 provides an address of the content campaign system 106 and instructions to the television client devices to send the television viewer information (or a copy thereof) directly to the content campaign system 106. In some embodiments, the television viewer information system 108 provides the television viewer information at regular intervals to the content campaign system 106 as television viewer information is gathered, such as every one or more seconds, minutes, or hours.

In various embodiments, the television viewer information system 108 provides the television viewer information to the content campaign system 106 based on additional or other factors. For example, the television viewer information system 108 provides the television viewer information to the content campaign system 106 upon gathering a threshold number of television viewer information transmissions, such as receiving 100, 500, or 1000 reports of television viewer information from television client devices. In another example, the television viewer information system 108 sends television viewer information to the content campaign system 106 when the payload size of the television viewer information reaches a threshold level (e.g., 500 kilobytes, 1 megabyte, etc.). Alternatively, in some embodiments, the television viewer information system 108 sends an individual report for each piece of television viewer information received from each television client device.

Further, the television viewer information system 108 may vary transmission rates based on time of day/peak viewing times. For instance, using one or more of the above transmission methods, the television viewer information system 108 provides television viewer information to the content campaign system 106 more frequently during primetime hours than during the middle of the night. Similarly, the television viewer information system 108 can adjust the payload size of television viewer information transmissions during busier times when more television viewer information is received from television client devices. In this manner, the television viewer information system 108 dynamically adjusts the frequency and size of television viewer information transmissions provided to the content campaign system 106.

As shown in FIG. 2, upon receiving the television viewer information, the content campaign system 106 identifies 206 IP addresses of the television client devices that provided the television viewer information. For example, the content campaign system 106 parses the television viewer information to identify the IP address and device identifier of each television client device that provided television viewer information. In addition, the content campaign system 106 can organize each piece of television viewer information based on IP address (and/or device identifier).

FIG. 2 also shows that the online activity information system 116 gathers 208 online activity information. In one or more embodiments, the online activity information system 116 receives online activity information from client computing devices as users interact with online digital content. For example, as users search for, browse, add to cart, and purchase products, the online activity information system 116 receives corresponding online activity information. Further, online activity information can include other online data, such as cookie data, session information, or user-provided data such as membership information, loyalty programs information, etc.

Upon gathering the online activity information, the online activity information system 116 provides 210 the online activity information to the content campaign system 106. In some embodiments, the online activity information system 116 is part of the content campaign system 106 or is a companion system to the content campaign system 106. For example, the online activity information system 116 and the content campaign system 106 are both parts of the content marketing system 104 described above with respect to FIG. 1. In these instances, the content campaign system 106 can directly access the online activity information as it is gathered from client computing devices.

As mentioned previously, each piece of online activity information includes the IP address of the client computing device where a user interacted with online digital content. In some instances, online activity information also includes the device identifier of the client computing device. Accordingly, as shown, the content campaign system 106 identifies 212 the IP addresses of the client computing devices from the online activity information.

As a note, the steps of gathering television viewer information, providing the television viewer information to the content campaign system 106, and identifying IP addresses of the television client device at the content campaign system 106 (i.e., steps 202-206) can occur before, after, and/or concurrently with the steps of gathering online activity information, obtaining the online activity information, and identifying IP addresses of the client computing devices (i.e., steps 208-212). Further, one or both sets of steps can repeat as additional information (e.g., television viewer information or online activity information) is received from client devices (e.g., the television client device and client computing devices).

FIG. 2 also shows the content campaign system 106 combining 214 the television viewer information and the online activity information based on matching IP addresses. Because each piece of television viewer information and each piece of online activity information are associated with an IP address (e.g., the household IP address), the content campaign system 106 can determine a correspondence between the television viewer information and the online activity information. Specifically, the content campaign system 106 identifies each instance where the IP address of a piece of television viewer information matches the IP address of one or more pieces of online activity information.

By matching IP addresses, the content campaign system 106 can identify television viewer information and online activity information belonging to the same user and/or the same household. Often, the content campaign system 106 will identify multiple matches between television viewer information and online activity information to the same IP address. For example, a user at a single location views multiple advertisements and television programs on their television client device as well as browses multiple Internet sites on their client computing device.

As just mentioned, in some instances, the content campaign system 106 detects that a household includes multiple users. As such, the IP address alone may not directly identify a specific user. In these instances, the content campaign system 106 can further analyze the information to determine to which user the information corresponds within a household having multiple users.

In one or more embodiments, the content campaign system 106 uses a device identifier to identify a user from other users within the household. For example, the content campaign system 106 identifies a cookie on a mobile device that identifies the user from other users in the household. The content campaign system 106 associates the device identifier of the mobile device with the user. Then, as online activity information arrives having the same device identifier as the mobile device, the content campaign system 106 associates the online activity information with the particular user.

In some cases, the content campaign system 106 uses metadata, such as timestamps, in connection with device identifiers to identify when a household includes multiple users. For example, the content campaign system 106 detects that two different client devices (i.e., based on device identifiers) are providing online activity information at the same time. In particular, the content campaign system 106 identifies multiple pieces of online activity information having similar timestamps (e.g., timestamps occurring within a few seconds of each other), but having different device identifiers. In these cases, the content campaign system 106 can isolate online activity information based on device identifiers for each household user.

In addition, or in the alternative, the content campaign system 106 detects/identifies multiple users in a household based on indicated preferences. For example, the content campaign system 106 identifies two or more distinct users based on the users having distinct preferences, behaviors, and interests. Further, in some embodiments, the content campaign system 106 determines that the television viewer information from a television client device better matches the preferences of one household user than other household users based on the preferences known for each household user.

Although a household can include multiple users, for ease of explanation, the remained of FIG. 2 is described in terms of a single household user. In this manner, television viewer information and online activity information having a matched IP address indicates activity by a single user. One will appreciate, however, that the content campaign system 106 can employ the same methods, techniques, and procedures for households that include multiple users.

The content campaign system 106 can apply additional filters to ensure that television viewer information and online activity information having with a matching IP address correspond to the same user. In one or more embodiments, the content campaign system 106 uses timestamps to filter out television viewer information and online activity information before or after matching IP addresses. In particular, the content campaign system 106 validates that the timestamp of the television viewer information is within a time range of the online activity information, such as within the same hour, day, week, etc. If not, the content campaign system 106 can perform additional validations, as described below, to ensure that the information corresponds to the same user.

By way of explanation, many IP addresses assigned to a household are temporarily assigned by an ISP. As such, the assigned IP address can change at any given moment. For example, when the household's network gateway device (e.g., a modem) restarts and/or renews its address lease with an ISP, the ISP can provide a new IP address to the modem. When the IP address of the household's network gateway device changes, so does the IP address for each television client device and client computing device in the household.

In some embodiments, an ISP can reassign an IP to a new household. In these embodiments, the IP address from online activity information from a former household may match the IP address of television viewer information from the new household even though the user from the first household is not the same user from the second household. Accordingly, as mentioned above, the content campaign system 106 can filter information based on a time frame (e.g., using timestamps) to ensure that the IP address correlates to the same user within the same household.

As also mentioned above, the content campaign system 106 can employ additional or alternative filtering validations to ensure television viewer information and/or online activity information corresponds to the same user within the same household. For example, the content campaign system 106 uses cookie information and/or device identifiers to match information to a household user. Generally, while IP addresses can change, device identifiers are largely static. For instance, a television client device or a client computing device has a fixed MAC address (and/or model-serial number identifier) that uniquely identifies the client device.

To illustrate by way of example, when the IP address corresponding to television viewer information matches the IP address of online activity information, but the timestamps are not within a specified range of one another (e.g., day, week, month, etc.), then, the content campaign system 106 can determine whether the device identifier of the television client device providing the television viewer information matches a previous device identifier stored in the composite database in connection with the user (previously obtained from cookies and other received correlated information). Similarly, the content campaign system 106 verifies that the device identifier of the client computing device also matches one of the stored device identifiers associated with the user.

Along similar lines, when the content campaign system 106 receives information (e.g., television viewer information or online activity information) from the television viewer information system 108 or the online activity information system 116, the content campaign system 106 determines if the device identifier is previously associated with a user or a household, and if so, associates the information with the user or the household. The content campaign system 106 can use the device identifier of a client device to supplement a user's information in the composite database in connection with, or in place of, using the IP address to determine a user correspondence.

In some embodiments, the content campaign system 106 determines whether television viewer information and online activity information are associated with the same user (e.g., can be combined) based on the device identifier of the network gateway device of a household. As mentioned above, network communications from client devices in the same household largely share the same IP address, which is the IP address that an ISP assigns to the household via the household's network gateway device. Accordingly, in addition to (or in place of) identifying the IP address associated with a household from either television viewer information or online activity information, the content campaign system 106 can identify the device identifier of the network gateway device from the information.

As an example, the content campaign system 106 receives television viewer information and online activity information. In each set of information, the content campaign system 106 identifies the same MAC address (i.e., device identifier) of the household's modem. As such, the content campaign system 106 can combine the received information together and associate the received information with the user/household in a composite database (e.g., the composite database 122). In some embodiments, the content campaign system 106 uses the network device identifier as an additional filter to ensure that television viewer information and online activity information correspond to the same user and/or household.

Returning now to FIG. 2, the content campaign system 106 determines 216 targeting parameters for an audiovisual content campaign based on the combined information. As mentioned above, targeting parameters can include one or more recommended audiovisual content items (e.g., audiovisual advertisements, promotions, or offerings) to provide to a target audience of users and/or information regarding which users to include in the target audience. Thus, as shown in the illustrated embodiment, the content campaign system 106 determines 216 targeting parameters including audiovisual content for the content campaign.

As one example of determining targeting parameters, the content campaign system 106 analyzes the combined television viewer information and online activity information for one or more users to determine patterns, behaviors, and or preferences. For example, the content campaign system 106 identifies a correspondence between an advertisement or television program viewed by a user on a television client device and products viewed (or purchased) by the user via their client computing device. Further, the content campaign system 106 can identify if the correspondence is shared among other users.

Based on determining the correspondence between the television viewer information and the online activity information for one or more users, the content campaign system 106 determines targeting parameters for an audiovisual content campaign. In some instances, the targeting parameters indicate particular audiovisual content to provide to television client devices via a television broadcast system. For example, based on identifying a product having a high rate of internet purchases shortly after a television audiovisual advertisement for the product is viewed in a specific region, the content campaign system 106 generates targeting parameters that indicate characteristics of the region, which the content marketing system 104 or the content provider system 118 can use to determine other regions where to show the television audiovisual advertisement.

As another example, by analyzing online activity information and television viewer information, the content campaign system 106 can determine a correspondence between users that view motorcycle racing shows and viewers that purchase motorcycle insurance online. Moreover, the content campaign system 106 can determine that users that view motorcycle racing shows also view crime drama television programs. Based on these determinations, the content campaign system 106 generates targeting parameters that include an indication to target motorcycle insurance audiovisual advertisements during one or more crime drama television programs.

Further, as part of generating the targeting parameters, the content campaign system 106 can identify a target region for providing audiovisual content. For example, continuing the previous example, the content campaign system 106 identifies a region where users are more likely to watch crime drama television programs. To illustrate, the content campaign system 106 can determine that viewers in Arizona watch crime drama television programs at a particularly high rate. In response, the content campaign system 106 can select Arizona as a region for an audiovisual content campaign for motorcycle insurance audiovisual advertisements.

In addition to identifying and/or selecting targeting parameters that include audiovisual content for a content campaign, the content campaign system 106 can also identify targeting parameters that include one or more user characteristics. For example, the targeting parameters include user characteristics defining a target audience. To illustrate, as mentioned in the above example, the content campaign system 106 identifies a region where users are more likely to watch crime drama television programs. In particular, the content campaign system 106 generates targeting parameters that include user characteristics and/or traits of users who would likely watch crime drama television programs, or that have previously watched crime drama television programs. In this manner, the content marketing system or content provider system 118 can use the characteristics with targeting parameters to select a target audience.

In addition, the content campaign system 106 can also select targeting parameters that include indications of when and where to air one or more audiovisual content items. For example, the targeting parameters indicate a specific time, station, channel, and/or network, when the audiovisual content should be displayed to users via their television client devices. In another example, the targeting parameters provide a prescribed frequency for providing the audiovisual content to a target audience. To illustrate, based on identifying that the most active internet purchasers also watch television programming at a particular time of day, the content campaign system 106 generates targeting parameters that target time slots during the particular time of day. As another example, upon determining that viewers of a first television show have visited a website, the content campaign system 106 generates targeting parameters that indicate a second television show where viewers have not yet visited the website.

The content campaign system 106 can also generate different targeting parameters based on geographical region. In one or more embodiments, as part of determining targeting parameters based on the correspondence of television viewer information and online activity information among users, the content campaign system 106 applies geographical or regional filters to the resulting targeting parameters. Indeed, as mentioned above, targeting parameters can include a particular geographical region or location that corresponds to one or more other targeting parameters. To explain, a television broadcast system broadcasts audiovisual content to a region of television client devices rather than individual television client devices. As such, the content campaign system 106 incorporates regional boundaries when determining targeting parameters that can be used to determine audiovisual content and/or one or more targeting audiences for each region.

Further, the content campaign system 106 can generate targeting parameters based on product data identified in both a user's television viewer information (i.e., television product data) as well as the user's online activity information (i.e., online product data). In some embodiments, if a correspondence is identified for a product between television product data and the online product data for a threshold number of users, then the content campaign system 106 can determine common attributes for the users and include the common attributes within the targeting parameters in connection with the product. In one or more embodiments, the content campaign system 106 indicates a correspondence score for a product based on the number of users that interacted with the product via both a television client device and a client computing device.

In addition, the content campaign system 106 can also generate targeting parameters based on a wide variety of product data. For example, the content campaign system 106 can generate targeting parameters based on whether a user viewed the product on a client computing device, nearly purchased the product (e.g., placing the product in a cart or bidding on the product), or purchased the product. Furthermore, the content campaign system 106 can determine targeting parameters based on a timetable for when a user saw a product on a television client device (e.g., within a television program and/or an advertisement) versus when the user interacted with the product via their client computing device. For instance, the content campaign system 106 can select targeting parameters based on a determination that a user purchased a product on a client computing device shortly before or after viewing the product on a television client device (i.e., a conversion following exposure to an advertisement indicates a positive result for selecting targeting parameters).

In some embodiments, the content campaign system 106 automatically generates targeting parameters, as described above. In alternative embodiments, the content campaign system 106 generates or suggests targeting parameters and provides the targeting parameters to a user (e.g., a content campaign administrator) for approval before committing the targeting parameters to one or more content campaigns. For example, the content campaign system 106 displays the targeting parameters to a user (e.g., advertiser). Upon approval from the user, the content campaign system 106 can then implement the targeting parameters in a content campaign.

As shown, the content campaign system 106 provides 218 the audiovisual content determined based on the targeting parameters for display. In particular, the content campaign system 106 provides the audiovisual content to the television broadcast system 114, which in turn, broadcasts the audiovisual content for display to one or more television client devices. For example, the content campaign system 106 provides audiovisual content to the television broadcast system 114 in connection with targeting parameters instructing the television broadcast system 114 to broadcast the audiovisual content to a particular target audience of user via their corresponding television client devices. For instance, the targeting parameters instruct the television broadcast system 114 to broadcast selected audiovisual content at a particular time, on a particular channel, and within a particular region.

In one or more embodiments, the content campaign system 106 provides the audiovisual content and/or targeting parameters to the content marketing system and/or content provider system 118. For example, the content campaign system 106 can provide the targeting parameters to the content provider system 118, and the content provider system 118 can utilize the targeting parameters to select impression opportunities (i.e., advertising slots associated with one or more users). Specifically, the content provider system 118 can identify advertising slots within linear television programming that satisfy the targeting parameters (e.g., region, viewer characteristics, and/or time of day). Moreover, the content provider system 118 can then provide the audiovisual content to television client devices within the advertising slot as part of the linear television programming.

In addition to providing audiovisual content to users via television client devices, in some embodiments, the content campaign system 106 provides digital content to users via client computing devices associated with the users. For example, the content campaign system 106 directly provides digital content to a user's client computing device (e.g., as part of an advertising slot on a website visited by the client computing device). The content campaign system 106 can provide the digital content directly to a client computing device or provide digital content indirectly through a third-party, such as an advertising agency system. Thus, as described in greater detail below, the content campaign system 106 can generate targeting parameters to provide to users across multiple different platforms and devices including television client devices and client computing devices.

While not illustrated in FIG. 2, the content campaign system 106 can repeat one or more of the steps (e.g., 202-218) shown in FIG. 2. For example, the content campaign system 106 can repeat a number of steps as part of a feedback loop to confirm the accuracy and/or usability of the determined targeting parameters. In some embodiments, the content campaign system 106 employs machine learning to train and refine the process of determining accurate and useable targeting parameters based on the feedback loop.

To illustrate a feedback loop, in one or more embodiments, the content campaign system 106 determines targeting parameters based on combined information for one or more users and provides the targeting parameters including selected audiovisual content to the television broadcast system 114 for display to television client devices of a target audience of users as part of a content campaign, as described above. Further, the content campaign system 106 receives television viewer information that identifies one or more television client devices included in the target audience. The content campaign system 106 parses the television viewer information to determine whether the television client devices in the target audience portrayed the selected audiovisual content, fast forwarded through the selected audiovisual content, or viewed other audiovisual content (e.g., another television show). Based on the determination, the content campaign system 106 refines the targeting parameters for the audiovisual content campaign and/or for future campaigns.

As discussed above, in one or more embodiments, the content campaign system 106 generates a composite database that includes television viewer information and online activity information corresponding to individual users. To illustrate, FIG. 3 shows an example composite database 300 in accordance with one or more embodiments described herein. The composite database 300 includes both television viewer information from users having television client devices and online activity information from users having client computing devices. Based on the composite database 300, the content campaign system 106 determines targeting parameters, which in turn, are used to provide content (e.g., audiovisual content) via one or more audiovisual content campaigns.

As shown, the composite database 300 includes various fields (e.g., 302-320) for each user, including a user identifier (or user id) 302, a household id 304, a household IP address 306 (or IP address 306), a third-party supplier 308, device id 310, device type 312 of a television client device or a client computing device, user attributes 314, behavior signatures 316, content consumption 318, and advertisement exposure 320. In some embodiments, the composite database 300 also includes the device id of a user's household's network gateway device, such as a MAC address or a model-serial number combination. For example, the device id of the network gateway device is included in the household IP address field in the composite database 300.

The composite database 300 includes, when available, both television viewer information and online activity information for a user. As illustrated, the composite database 300 includes a single entry for each user that includes all television viewer information, online activity information, and other attributes associated with the user. In alternative embodiments, the composite database 300 includes a separate record or entry (i.e., row) for each piece of received television viewer information and online activity information. In addition, the composite database 300 can further include timestamp information, specific product data, and other metadata associated with each piece of information received from a user's television client devices or client computing devices.

As a general overview of the fields in the composite database 300, the user id 302 uniquely identifies a user, the household id 304 identifies a household to which a user belongs, and each household id is associated with an IP address 306. The third-party supplier 308 indicates the third-party that provides television viewer information (e.g., TV MFG. A and TV MFG. B) or online activity information (e.g., DataSource and LiveData) to the content campaign system 106 to include in the composite database 300. The device id 310 and device type 312 indicate what type of client device is providing information (e.g., a television client device or a client computing device) and an identifier associated with the client device. As shown, for client computing devices, the device type 312 identifies a specific client computing device type, such as a phone, tablet, laptop, or desktop.

The user attributes 314 indicate one or more attributes gathered from the television viewer information, online activity information, and/or other sources. As shown, attributes include demographic parameters (e.g., age or gender) or segment parameters (e.g., location, memberships, or ownership details). The content campaign system 106 can determine user attributes from cookies, session data, user-provided data, loyalty programs, and/or other sources. Similarly, the behavior signatures 316 includes implicit or explicit patterns, behaviors, and preferences associated with the user gather and/or determined from received information, such as likes, activities pursued, user profiles, or purchasing activities.

The content consumption 318 in the composite database 300 indicates content experienced by a user via a client device associated with the user. As one example, content consumption 318 indicates television shows/programs, networks, etc. watched by the user via the user's television client device. As another example, the content consumption 318 indicates websites, social media sites, search results, etc., experienced by a user via one or more client computing devices. The advertisement exposure 320 indicates a number of times a particular advertisement from a specific campaign was displayed and on which client devices the advertisement was displayed.

As shown in FIG. 3, the content campaign system 106 assigns each user in the composite database 300 a unique user id 302 that distinguishes a user from other users. For ease of explanation, the first user is shown having a user id 302 of "1," the second user is shown having a user id 302 of "2," etc. In some embodiments, the same user is assigned multiple user ids (e.g., as separate users) having separate records in the composite database 300. In these embodiments, if the content campaign system 106 later determines that two records correspond to the same user, the content campaign system 106 can merge the two user records into a single record for the user. Likewise, the content campaign system 106 can separate a single record into multiple records upon determining that the record corresponds to multiple users (e.g., the content campaign system 106 determines that a household includes more than one user as additional household information is received).

In addition to assigning a user id 302, the content campaign system 106 assigns a household id 304 to each user/record in the composite database 300. Further, as shown in the composite database 300, the household id 304 is associated with the household's IP address 306, which represents the IP address of the network gateway device (e.g., modem, switch, etc.) for the household, as described above. Multiple users can have the same household id 304 if the users belong to the same household. For example, the first user and the second user in the composite database 300 both have the household id 304 of "22" indicating that the first user and the second user reside together. Specifically, client devices associated with the first and second user each use the same household IP address (i.e., xxx.xxx.xxx.134) to connect to the Internet.

In some embodiments, the content campaign system 106 assigns multiple household ids to a single user. For example, the third user has two household ids (e.g., 36 and 83). The content campaign system 106 can assign multiple household ids to a user to indicate that the user regularly interacts with one or more client devices from multiple locations. For instance, a user's mobile phone and laptop routinely indicate online activity information from a home location and a work location. In one or more embodiments, the content campaign system 106 uses device ids, cookies, or other informative data to associate online activity information with a user within the composite database 300, even when the user is at a remote location or otherwise not accessing the Internet via their household network gateway device (e.g., using a cellular network connection).

Upon receiving television viewer information or online activity information, the content campaign system 106 can add the information to the composite database 300. For example, when the content campaign system 106 receives television viewer information from a television viewer information system, the television viewer information includes the IP address 306, device id 310, and device type 312 of the television client device that provided the television viewer information. Further, the television viewer information can include information indicating a user's behavior signatures 316, content consumption 318 (e.g., television shows displayed), and advertisement exposure 320 (e.g., which advertisements from which campaigns were displayed on which client devices). While not illustrated for simplicity, the audiovisual content (e.g., programs and advertisements) included in television viewer information can include additional identifiers and metadata, as described above.

With regard to online activity information, the content campaign system 106 can populate the composite database 300 with information included in online activity information obtained by monitoring one or more client computing devices (directly or via an online activity information system). For example, the online activity information indicates the IP address 306, device id 310, and device type 312 of the client computing device that provided the online activity information. In addition, the online activity information can indicate content consumption 318 (e.g., web sites visited and product data) and advertisement exposure 320 (e.g., advertisements displayed to the user) including the specific client computing device on which an advertisement was displayed.

In addition, the online activity information can indicate cookies, session data, browser history, loyalty program information, user-provided data, etc., which the content campaign system 106 can use to populate user attributes 314 and behavior signatures 316. For instance, the online activity information provides information that enables the content campaign system 106 to create and populate user attributes within the composite database 300. In another instance, the online activity information provides information which the content campaign system 106 uses to infer attributes for a user.

Upon receiving a piece of television viewer information or online activity information, the content campaign system 106 identifies the IP address. Using the IP address, the content campaign system 106 determines whether the composite database 300 includes a record having a matching IP address. If not, the content campaign system 106 creates a new record in the composite database 300. For example, the record for the fourth user contains only online activity information and the record for the fifth user contains only television viewer information.

If the content campaign system 106 identifies the IP address in the composite database 300, the content campaign system 106 combines the received information with the record in the composite database 300 having the matching IP address. For example, if the content campaign system 106 receives television viewer information that includes the IP address of xxx.xxx.xxx.78, the content campaign system 106 can add the received information from the television viewer information to the record associated with the fourth user. In another example, if the content campaign system 106 receives television viewer information that includes the IP address of xxx.xxx.xxx.21, the content campaign system 106 can add the received information from the television viewer information to the record associated with the fifth user.

In some embodiments, the content campaign system 106 identifies multiple records in the composite database 300 having a matching IP address (e.g., the records of the first user and the second user share the same IP address). In these embodiments, the content campaign system 106 can apply additional filters, such as comparing device id and device type from the received information to the device id 310 and device types 312 for each record having a matching IP address. The content campaign system 106 can employ additional filters, such as a time frame filter (e.g., using timestamps) and/or another filter described above, to determine which record or records in the composite database 300 with which to add the received information.

In additional or alternative embodiments, the content campaign system 106 employs other common data features to identify a correspondence in the online activity information and television viewer information for individual users. For example, the content campaign system 106 can utilize the network device identifier, device id/device type, or another device identifier to match received information to a record in the composite database 300. For example, if the content campaign system 106 cannot find a matching IP address, before creating a new record in the composite database 300, the content campaign system 106 determines whether a record in the composite database 300 includes a network device identifier that matches the network device identifier indicated in the received information. If so, the content campaign system 106 can combine the received information with the record. Further, in some embodiments, the content campaign system 106 can note that the IP address 306 for a household has possibly updated.

As an example, in one or more embodiments, the composite database 300 maintains the IP version 6 (or IPv6) address for each client device. When using IPv6, a user's television client device and a user's client computing device would not share a common household IP address as each client device would have its own global IPv6 address. In this manner, the IPv6 address assigned to a client device is similar to a device id assigned to a client device—it is an identifier that uniquely distinguishes the client device's location from the location of all other client devices connected to the Internet.

In embodiments that include IPv6 addresses, the television viewer information and online activity information can include the IPv6 address or identifier of the network gateway device. As such, the content campaign system 106 can identify client devices associated with the same user based on the network gateway's identifier, as data to a client device within the household will still likely pass through the household's network gateway device.

As described above, the content campaign system 106 can use the composite database 300 to generate targeting parameters. For example, in one or more embodiments, the content campaign system 106 analyzes the records in the composite database 300 to identify commonalities, patterns, or trends between users, such as attributes (including location/region), behaviors, content consumption, and advertisement exposure for records that include a correspondence of television viewer information and online activity information. Based on these commonalities, patterns, or trends, the content campaign system 106 determines one or more targeting parameters for one or more campaigns. In some embodiments, generating targeting parameters includes determining a target audience and/or selecting content (e.g., audiovisual content) to provide to a target audience, as previously described.

By creating, maintaining, and employing the composite database 300, the content campaign system 106 can achieve a number of benefits and features. As one example, the composite database 300 provides flexible targeting with campaigns, which enables the content campaign system 106 to reach any segment of users using one or more client device types. In addition, the increased flexibility enables the content campaign system 106 to build optimized campaigns with the most efficient content for any given combination of client device types.

As another example, the composite database 300 provides the content campaign system 106 with improved user reach and managed frequency. For instance, the content campaign system 106 employs the composite database 300 to achieve de-duplication of content impressions to users as well as better manage the frequency of providing content. Further, employing the composite database 300 enables the content campaign system 106 to improve re-targeting efforts to users via specific client devices. The composite database 300 also enables the content campaign system 106 to achieve deeper, more accurate, reporting and measurements. For example, the composite database 300 provides consolidated reporting across client device types and properly reports conversion information from particular client device types.

Figure 4:
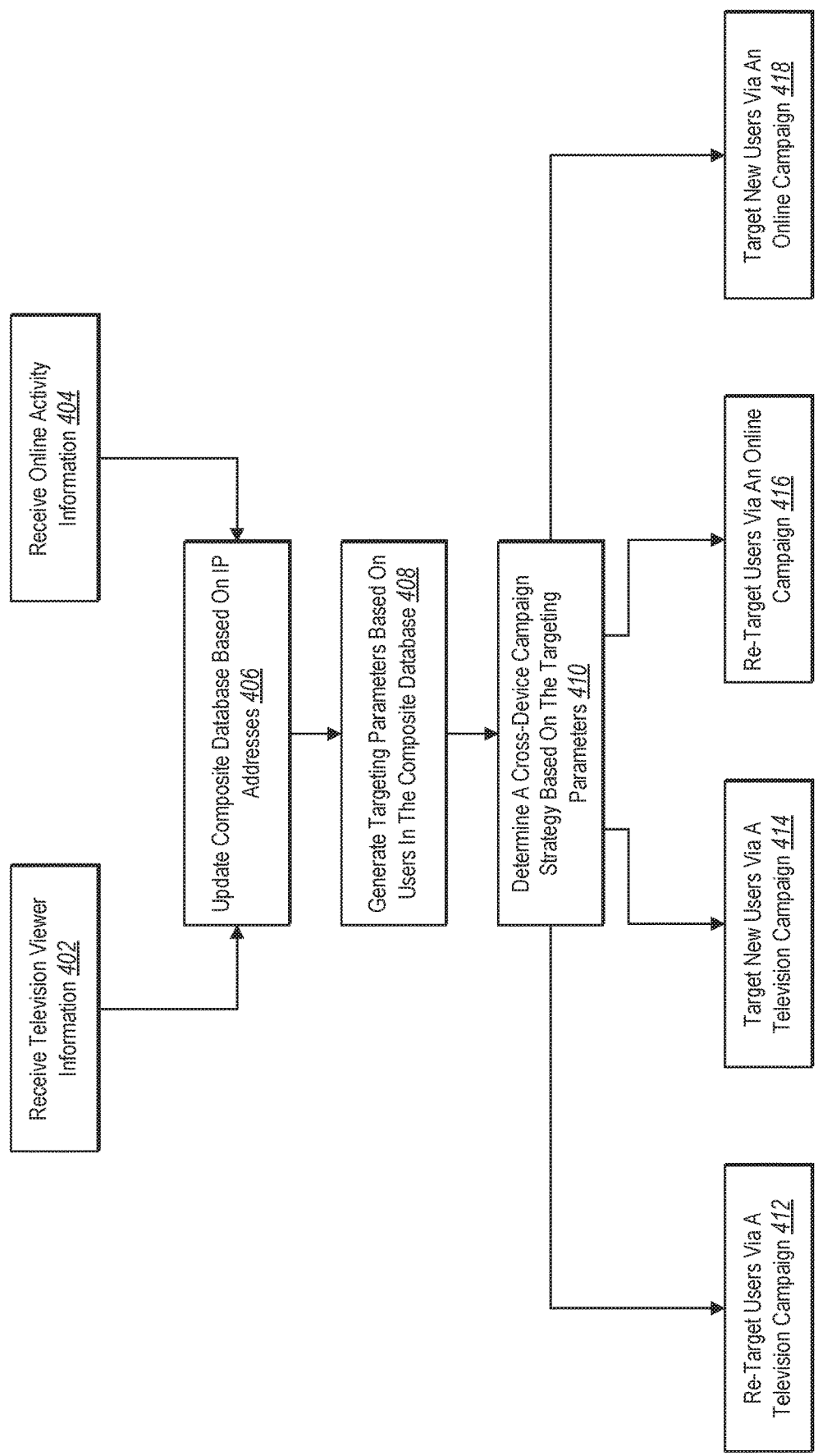
FIG. 4 illustrates an example flow diagram of determining a segment of users in accordance with one or more embodiments.

Turning now to FIG. 4 additional detail will be provided regarding generating an advertising campaign in accordance with one or more embodiments. In particular, FIG. 4 shows a flow diagram of the content campaign system 106 determining a segment of users. Specifically, FIG. 4 illustrates the content campaign system 106 creating and executing cross-device campaigns based on targeting parameters. For example, the content campaign system 106 uses targeting parameters to organize a content campaign to target new users, re-target existing users, provide new content, re-provide existing content, target a specific client device, and/or target a combination of client devices.

As shown in FIG. 4, the content campaign system 106 receives 402 television viewer information. For example, the content campaign system 106 receives television viewer information from a television viewer information system, such as a television manufacturer, where the television viewer information includes viewership data from programs displayed on network-enabled television client devices (i.e., television client devices having an IP address). The television viewer information includes the IP address and device identifier of each television client device along with audiovisual content displayed on the television client device, as described above.

The content campaign system 106 also receives 404 online activity information. In some embodiments, the content campaign system 106 accesses online activity information previously received from a historical database of online activity information, where the historical database is maintained by the content campaign system 106 (or by a third-party). As with television viewer information, the online activity information includes the IP address (and/or device identifier) of the client computing device used by a user to interact with online content. In addition, the online activity information includes data regarding the user's online activity, as described above.

As shown, the content campaign system 106 updates 406 a composite database based on the IP addresses. In particular, based on identifying a matching IP address between television viewer information and online activity information, the content campaign system 106 merges the information to form a combined or fused record within the composite database. An example of a composite database is shown in FIG. 3.

The content campaign system 106 generates 408 targeting parameters based on users in the composite database. As described above, the content campaign system 106 identifies commonalities, patterns, or trends between television viewer information and online activity information for one or more users within the composite database. Further, based on the identified users, the content campaign system 106 generates targeting parameters to improve existing or future campaigns.

As shown, the content campaign system 106 determines 410 a cross-device campaign strategy based on the targeting parameters. In one example, the content campaign system 106 determines a strategy to improve an existing campaign based on the targeting parameters. In another example, the content campaign system 106 determines a strategy for a new campaign based on the targeting parameters. As part of determining a content campaign strategy, the content campaign system 106 defines or re-defines targeting parameters. For instance, the content campaign system 106 defines or re-defines which users to include in a target audience, which client device types best reach the target audience, and which audiovisual content best engages the target audience.

Based on the determined campaign strategy, the content campaign system 106 can provide the selected content via one or more client device types. For example, as shown, the content campaign system 106 re-targets 412 users via a content campaign. For instance, the content campaign system 106 uses the targeting parameters to determine that a group of users has previous exposure to specific content either via the user's television client device and/or client computing devices. Accordingly, the content campaign system 106 determines to re-target the users via an audiovisual content campaign by providing the same/similar audiovisual content or new audiovisual content to the users via television client devices.

In another example, the content campaign system 106 determines, based on the targeting parameters, to target 414 new users via an audiovisual content campaign. For instance, the content campaign system 106 identifies one or more users from the targeting parameters that have not yet viewed specific content either via television client device and/or client computing devices. As such, the content campaign system 106 targets these "new" users in an attempt to increase the reach (i.e., incremental reach) of a content campaign beyond previous efforts. Further, as part of reaching additional users, the targeting parameters can identify a network, channel, and/or timeslot when to display audiovisual content.

To illustrate, the content campaign system 106 identifies, from both television viewer information and online activity data, that a high number of dog owners watch the nightly news in a particular geographical region. Further, based on television viewer information and online activity data, the content campaign system 106 determines a discrepancy in dog owners that have visited a particular website. In particular, dog owners in the region who watch the nightly news have visited a particular product website at a lower rate than dog owners in the region who watch other television programs. Accordingly, the content campaign system 106 can increase the incremental reach of an audiovisual content campaign by providing the audiovisual advertisement for display to the television client devices that show the nightly news. Specifically, the content campaign system can utilize online activity information and television viewer information identify a user segment with lower exposure (e.g., dog owners that watch the nightly news) to a particular advertisement or product and then generate targeting parameters to reach the user segment (e.g., select an advertisement to be displayed during the nightly news). Additional disclosure regarding incrementally reaching unexposed target viewers in an advertising campaign is provided in U.S. patent application Ser. No. 15/282,992, filed Sep. 30, 2016, the entire contents of which is hereby incorporated by reference.

As shown, the content campaign system 106 also re-targets 416 users via an online campaign. For example, the content campaign system 106 uses the targeting parameters, as described above, to identify a target audience, audiovisual content, and a particular client device type for an audiovisual content campaign. For instance, the content campaign system 106 identifies users previously exposed to particular audiovisual content via their television client device but has not viewed the particular audiovisual content via a client computing device. Accordingly, the content campaign system 106 determines to re-target users previously exposed to digital content via the user's client computing device (e.g., phone, laptop, desktop, or tablet). For example, the content campaign system 106 provides the selected digital content via a website, email, in-app advertisement, or search result that a user frequents, as determined from the targeting parameters.

FIG. 4 also shows the content campaign system 106 targeting 418 new users via an online campaign. For example, the content campaign system 106 identifies a new set of users (e.g., a target audience) as described above. For instance, the content campaign system 106 identifies a target audience of users that has not engaged with selected audiovisual content either via a client computing device or a television client device. Thus, based on the composite database and the targeting parameters, the content campaign system 106 determines to provide digital content to these new users via an online campaign. As such, the content campaign system 106 provides the new users the selected digital content via each user's client computing device (e.g., phone, laptop, desktop, or tablet).

In one or more embodiments, the content campaign system 106 determines a content campaign strategy that serves content on multiple client device types, such as both a television client device and client computing device. Further, in some embodiments, the content campaign system 106 determines to serve digital content via a particular client computing device, such as on a mobile phone or tablet when serving the digital content via a client computing device.

As an illustration of a cross-device campaign strategy, in some embodiments, the content campaign system 106 provides a product advertisement to a user's television client device after identifying that the user engaged with the product via the user's client computing device. By providing a product advertisement to a user's television client device after identifying that the user engaged with the product on a client computing device, the content campaign system 106 provides reinforcement of the advertisement's affect. Similarly, when the content campaign system 106 provides a product advertisement to users who have not engaged with the product on any client device type, the content campaign system 106 provides additional reach for the product. In this manner, the content campaign system 106 provides reinforcing and/or incremental reach within a content campaign. Additional disclosure regarding planning and executing an advertising campaign targeting television viewers and digital media viewers across formats and screen types is provided in U.S. patent application Ser. No. 14/923,153, filed Oct. 26, 2015, the entire contents of which is hereby incorporated by reference.

Figure 5:
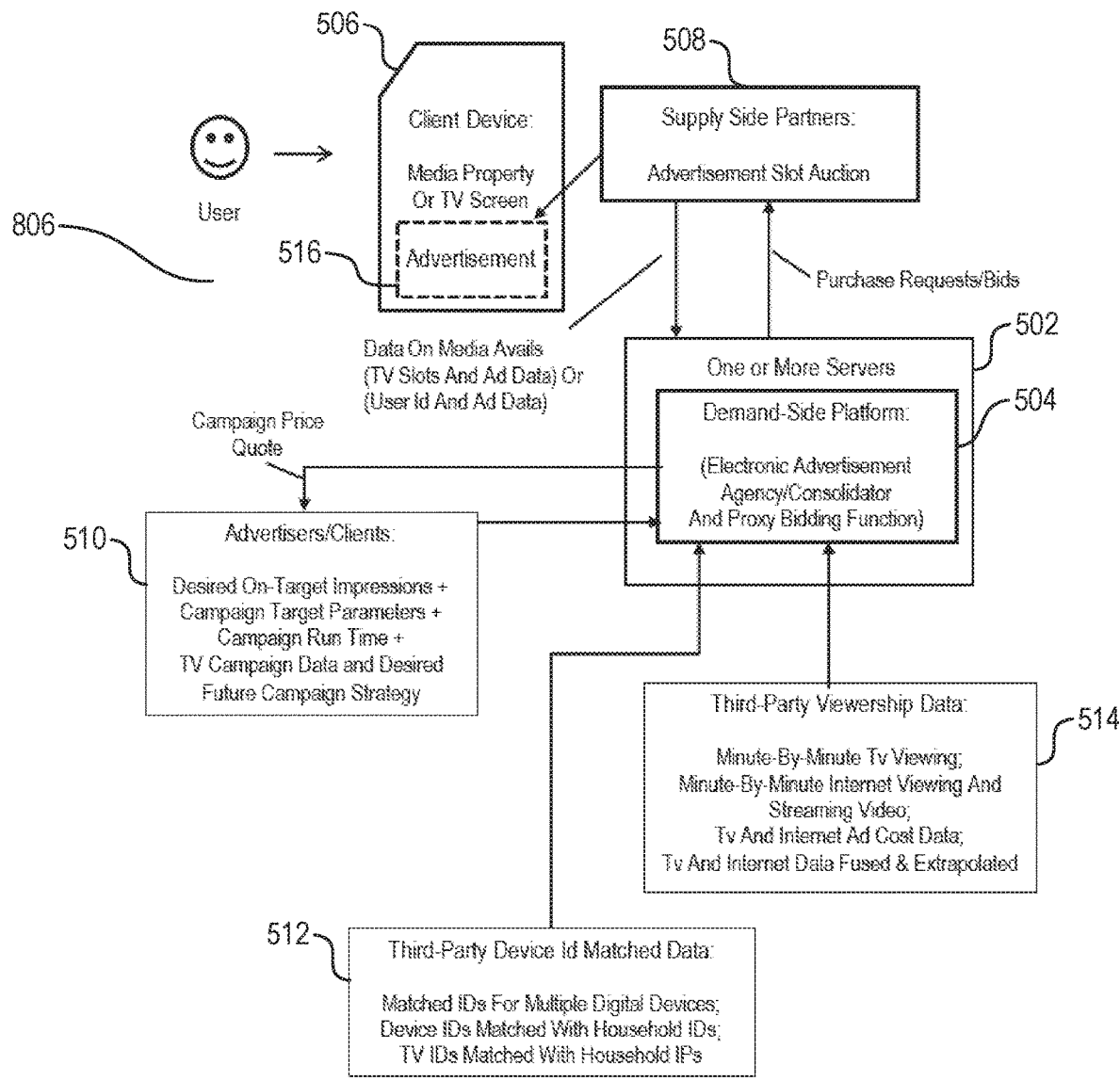
FIG. 5 illustrates a block diagram of an example environment of a demand-side platform interacting with various systems and devices in accordance with one or more embodiments.

Turning now to FIG. 5 additional detail will be provided regarding an environment for running a content campaign via client devices in accordance with one or more embodiments. In particular, FIG. 5 shows a block diagram of an example environment 500 of a demand-side platform (DSP) 504 interacting with various systems and devices to provide content to client devices. As shown, the example environment 500 includes a demand-side platform 504 located on one or more servers 502, a client device 506, a supply side partner 508, advertisers/clients 510, third-party device id matched data 512, and third-party viewership data 514.

In one or more embodiments, the demand-side platform 504 operates as part of the content campaign system 106 described above. In some embodiments, the demand-side platform 504 facilitates planning and executing content campaigns, which can include maintaining user profiles and attributes from current and previous campaigns. As shown, the demand-side platform 504 is an electronic advertisement agency/consolidator that facilitates proxy bidding functions. Proxy bidding functions are described further below.

As shown, the demand-side platform 504 communicates with a supply side partner 508. In particular, the demand-side platform 504 purchases/requests bids for advertisement slots from the supply side partner 508. The supply side partner 508, as shown, facilitates placing an advertisement 516 (e.g., content) on a media property (e.g., a website, game, linear television programming, or application where content may appear on a screen) provided via the client device 506 (e.g., a television client device or client computing device) to be viewed by a user. For instance, the supply side partner 508 uses bidding auctions to sell slots available via the media properties. In some embodiments, the supply side partner 508 is an example embodiment of the content provider system 118 described above with respect to FIG. 1.

In addition, the supply side partner 508 supplies data on media avails to the demand-side platform 504. Media avails can include unsold units of time available for broadcasters to sell to advertisers and/or the number of impressions available for purchase on a daily or monthly basis for a given media property. For example, in one or more embodiments, the supply side partner 508 sends a website advertisement slot (or a television slot) to the demand-side platform 504 together with advertising data (e.g., information regarding the user and/or the media property). For instance, the supply side partner 508 sends a user id and an indicator of the media property to the demand-side platform 504.

FIG. 5 also shows advertisers/clients 510. In general, the advertisers/clients 510 provide targeting and campaign planning information to the demand-side platform 504. As illustrated the advertisers/clients 510 monitor and provide desired on-target impressions, campaign targeting parameters, campaign runtime parameters, content campaign data, and/or a desired future campaign strategies.

Based on the information provided by the advertisers/clients 510, the demand-side platform 504 can generate a purchase request or bid for an ad slot (or a television slot) that is supplied to a supply side partner 508 during the execution stage of a content campaign. The formulation of such a purchase request or bid, in one or more embodiments, is based on third-party viewership data 514, which may include television viewing information and/or combined viewing information from both television viewer information and online activity information. In addition, the formulation of the purchase request or bid, in some embodiments, is based on third-party device id matched data 512, which includes matched id for multiple client devices, client computing device ids matched with household ids, and/or television client device ids matched with household ids.

As described above, by monitoring online activity of users, the demand-side platform 504 can verify that audiovisual content displayed to the user via their television client device led to an online conversion via a client computing device. In this manner, the demand-side platform 504 can track the effectiveness of an audiovisual content campaign, incorporate feedback and results of the composite information, and improve a current or future audiovisual content campaign.

To illustrate, the demand-side platform 504 tracks which households saw a particular audiovisual advertisement. In addition, the demand-side platform 504 matches online conversions for each of the households (e.g., the number of that visited a website or purchased a product related to the particular audiovisual advertisement). Based on the number of conversions, the demand-side platform 504 can determine the effectiveness of a current audiovisual content campaign. For example, if the audiovisual content campaign is above a threshold effectiveness level, the demand-side platform 504 automatically extends the audiovisual content campaign. In an alternative example, if the audiovisual content campaign is below a threshold effectiveness level, the demand-side platform 504 can modify the characteristics of the audiovisual content campaign and later reassess the audiovisual content campaign. For instance, the demand-side platform 504 uses the targeting parameters to refine the target audience or select a different time slot/network to show the audiovisual content.

The demand-side platform 504 can perform a number of additional actions that affect the planning and execution of current and future campaigns. For example, the demand-side platform 504 can raise priority of particular user characteristics in generating targeting parameters in planning future campaigns, increase the propensity to bid for online advertisements for users with matching user characteristics, and/or increase the bid price for online impressions matching targeting parameters.

In addition, the demand-side platform 504 can modify budgets and/or prioritize one audiovisual content item over another audiovisual content item. To illustrate, the demand-side platform 504 determines to increase or reduce the budget for a future audiovisual content campaign based on the effectiveness of a current similar audiovisual content campaign. In addition, the demand-side platform 504 determines that a first audiovisual content item displayed on television client devices yields higher online conversion rates than a second audiovisual content item displayed on the same television client devices, based on the same targeting parameters.

In addition, if a large percentage of television users of a particular advertisement have converted online, the demand-side platform 504 can raise the price for future placements of that advertisement displayed via television client devices. Further, the demand-side platform 504 can make that adjustment for a given television region because the location of the online users is known for the given region.

As mentioned above, in one or more embodiments, the content campaign system 106 and/or demand-side platform 504 facilitates proxy bidding functions. The following provides additional description regarding bidding as it relates to bidding for digital content (e.g., advertisements) served via client computing devices as part of an online campaign.

Online advertising supply side partners (e.g., a content provider system 118) typically provides a sale opportunity or bid request package—often including ad slot data—to the content campaign system 106 and/or demand-side platform 504. The content campaign system 106 and/or demand-side platform 504, provides an automatic response (based on targeting parameters) to the supply side partner, that includes a bid and/or an advertisement. It is important to note that from the time such a bid request package is issued, the content campaign system 106 and/or demand-side platform 504 must often supply a bid response to the supply side partner within a fixed time period such as 200 milliseconds or less. If the bid response is not received within that time period, the bid is ignored. As such, the processes described herein for execution of an online campaign can be extremely time-sensitive.

In addition, during the analysis and actionable processes involved, the content campaign system 106 and/or demand-side platform 504 often processes millions of data elements within the fixed time period. As noted above, in one or more embodiments, the content campaign system 106 and/or demand-side platform 504 must both analyze and respond with a bid to an online advertisement slot opportunity in less than 200 milliseconds or the bid will be ignored.

Figure 6:
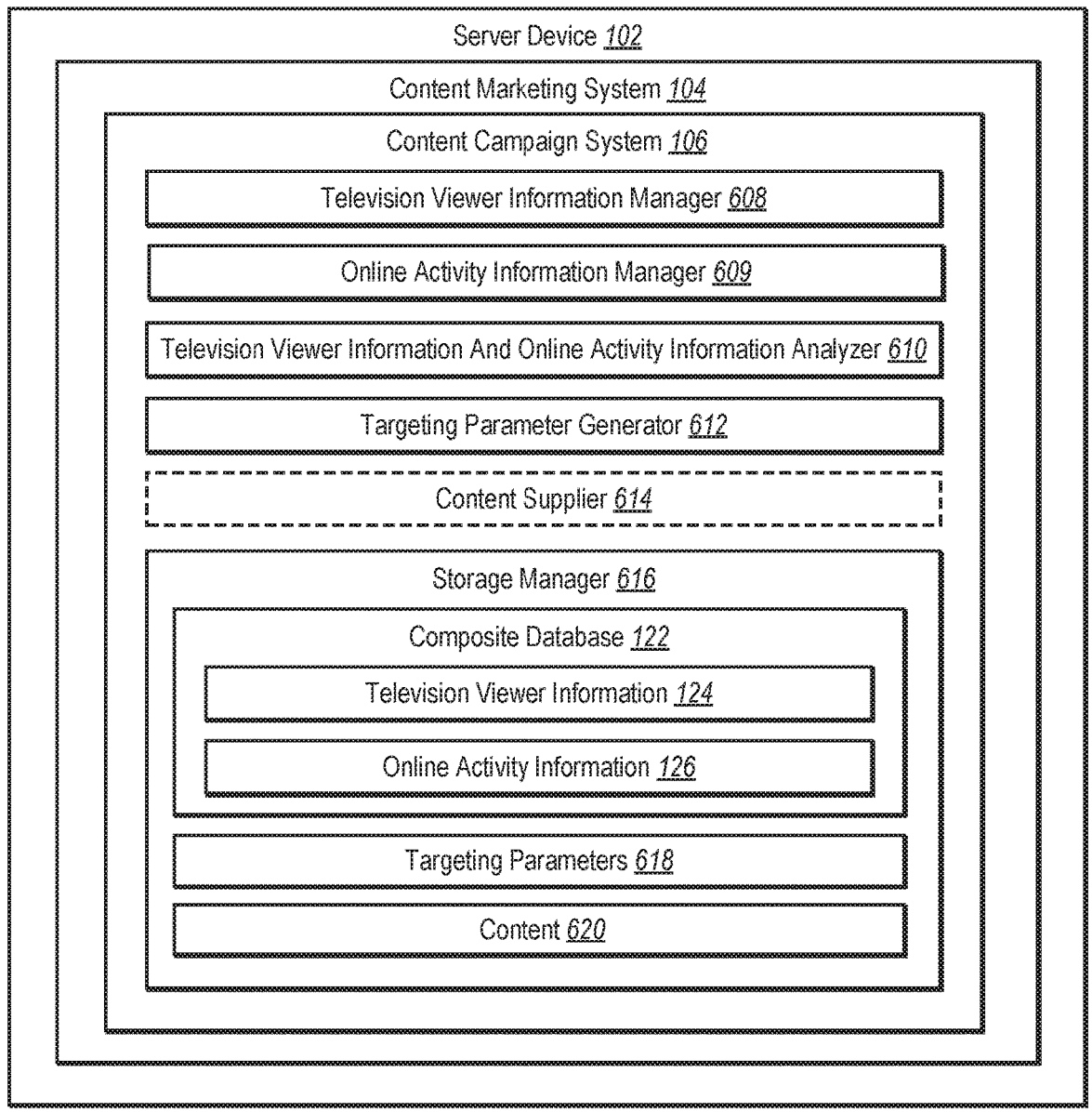
FIG. 6 illustrates an example schematic diagram of the content campaign system in accordance with one or more embodiments.

Turning now to FIG. 6, additional detail will be provided regarding capabilities and components of the content campaign system 106 in accordance with one or more embodiments. In particular, FIG. 6 shows an example schematic diagram of the content campaign system 106, the server device 102, and the content marketing system 104, described above in relation to FIG. 1. As mentioned in relation to FIG. 1, in one or more embodiments, some or all of the components of the content campaign system 106 can be implemented separately from the content marketing system 104 and the server device 102.

As shown, the content campaign system 106 in FIG. 6 includes a television viewer information manager 608, an online activity information manager 609, a television viewer information and online activity information analyzer 610, a targeting parameter generator 612, and an optional content supplier 614. In addition, the content campaign system 106 includes a storage manager 616 that maintains a composite database 122, targeting parameters 618, and content 620.

As just mentioned, and as shown in FIG. 6, the content campaign system 106 includes the television viewer information manager 608. The television viewer information manager 608 can obtain, identify, gather, determine, monitor, and/or receive television viewer information. For example, in one or more embodiments, the television viewer information manager 608 gathers television viewer information directly from client television client devices. In some embodiments, the television viewer information manager 608 obtains television viewer information from a third-party source, such as a television viewer information system.

As illustrated in FIG. 6, the content campaign system 106 also includes the online activity information manager 609. The online activity information manager 609 can obtain, identify, gather, determine, monitor, and/or receive online activity information. For example, the online activity information manager 609 can directly monitor user interactions with online digital content utilizing cookies or server-side monitoring to obtain online activity information. In addition, in some embodiments, the online activity information manager 609 obtains online activity information from a third party an online activity information system, as described above. In various embodiments, the information manager 608 directly collects online activity information from one or more client computing devices. Further, the information manager 608 can obtain user information from previous campaigns and operations. Upon receiving information, the information manager 608 can store the information in the composite database 122, as previously described.

The television viewer information and online activity information analyzer 610 can determine, identify, generate, or analyze correspondences and/or correspondences between television viewer information and online activity information (e.g., as stored in the composite database 122). In one or more embodiments, as described above, the television viewer information and online activity information analyzer 610 identifies when information provided by a television client device (e.g., television viewer information 624) is from the same user and/or household as information provided by a client computing device (e.g., online activity information 126). In some embodiments, the television viewer information and online activity information analyzer 610 matches IP addresses to determine a correspondence between television viewer information of a user and online activity information of the same user. In some embodiments, the television viewer information and online activity information analyzer 610 compares device identifiers to determine a correspondence.

In addition to identifying television viewer information and online activity information corresponding to individual users, in various embodiments, the television viewer information and online activity information analyzer 610 also analyzes television viewer information and online activity information to determine additional patterns, trends, or correspondences. For example, the television viewer information and online activity information analyzer 610 determines trends in the composite database 122 having correlated television viewer information and online activity information, with regard to various characteristics or parameters. To illustrate, the television viewer information and online activity information analyzer 610 can determine a correspondence between product data (e.g., products viewed) in television viewer information (i.e., television product data) and product data (e.g., products purchased) in online activity information (i.e., online product data).

As shown in FIG. 6, the content campaign system 106 also includes the targeting parameter generator 612. The targeting parameter generator 612 can generate, create, determine, and/or identify targeting parameters for one or more campaigns. In particular, the targeting parameter generator 612 can generate targeting parameters for audiovisual content campaigns based on trends, patterns, or correspondences identified by the television viewer information and online activity information analyzer 610. In some embodiments, generating targeting parameters includes identifying a target audience and/or audiovisual content to provide to a target audience. In addition, the targeting parameters can specify a preference television time slot, channel, network, program, geographical region, etc. for displaying audiovisual content on television client devices for an audiovisual content campaign.

In one or more embodiments, the targeting parameter generator 612 provides the targeting parameters to a content supplier 614. As shown, the content campaign system 106 optionally includes the content supplier 614. The content supplier 614 can identify and provide content based on targeting parameters provided by the targeting parameter generator 612. For example, the content supplier 614 can comprise a demand-side platform and/or supply side platform that bids on available advertising slots (and provides ads for the advertising slots) based on the targeting parameters.

As shown in FIG. 6, the content campaign system 106 includes the storage manager 616. In general, the storage manager 616 maintains, stores, organizes, and/or retrieves data associated with the content campaign system 106. For example, the storage manager 616 includes the composite database 122, targeting parameters 618, and content 620, described above. For instance, the composite database 122 includes television viewer information 124, online activity information 126. In addition, the composite database 122 can represent an embodiment of the composite database described above, such as composite database 300.

The components 608-616 of the content campaign system 106 can include software, hardware, or both. For example, the components 608-616 can include one or more instructions stored on a computer-readable storage medium and executable by processors of one or more computing devices, such as a client device or server device. When executed by the one or more processors, the computer-executable instructions of the content campaign system 106 can cause the computing device(s) to perform the feature learning methods described herein. Alternatively, the components 608-616 can include hardware, such as a special-purpose processing device to perform a certain function or group of functions. Alternatively, the components 608-616 of the content campaign system 106 can include a combination of computer-executable instructions and hardware.

Furthermore, the components 608-616 of the content campaign system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 608-616 may be implemented as a stand-alone application, such as a desktop or mobile application. Furthermore, the components 608-616 may be implemented as one or more web-based applications hosted on a remote server. The components 608-616 may also be implemented in a suite of mobile device applications or "apps." To illustrate, the components 608-616 may be implemented in an application, including but not limited to ADOBE PRIMETIME software. "ADOBE," and "PRIMETIME" are either registered trademarks or trademarks of Adobe Systems Incorporated in the United States and/or other countries.

FIGS. 1-6, the corresponding text, and the examples provide a number of different systems and devices of the content campaign system in accordance with one or more embodiments. In addition to the foregoing, one or more embodiments can also be described in terms of flowcharts comprising acts in a method for accomplishing a particular result. For example, FIGS. 7 and 8 illustrate flowcharts of exemplary methods in accordance with one or more embodiments described herein.

Figure 7:
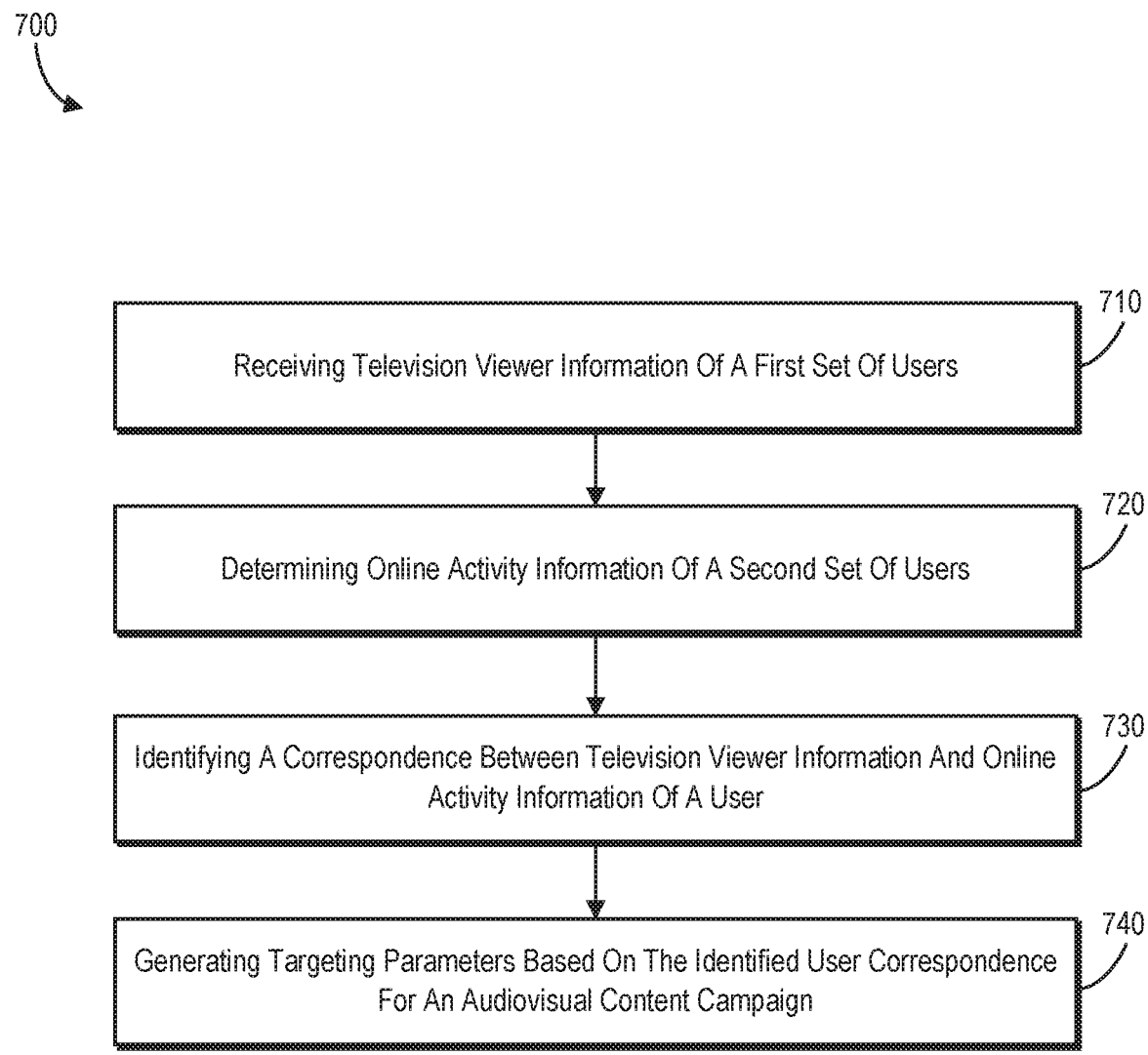
FIG. 7 illustrates an example flow diagram of a method for selecting campaign parameters for serving audiovisual content via television devices in accordance with one or more embodiments.
Figure 8:
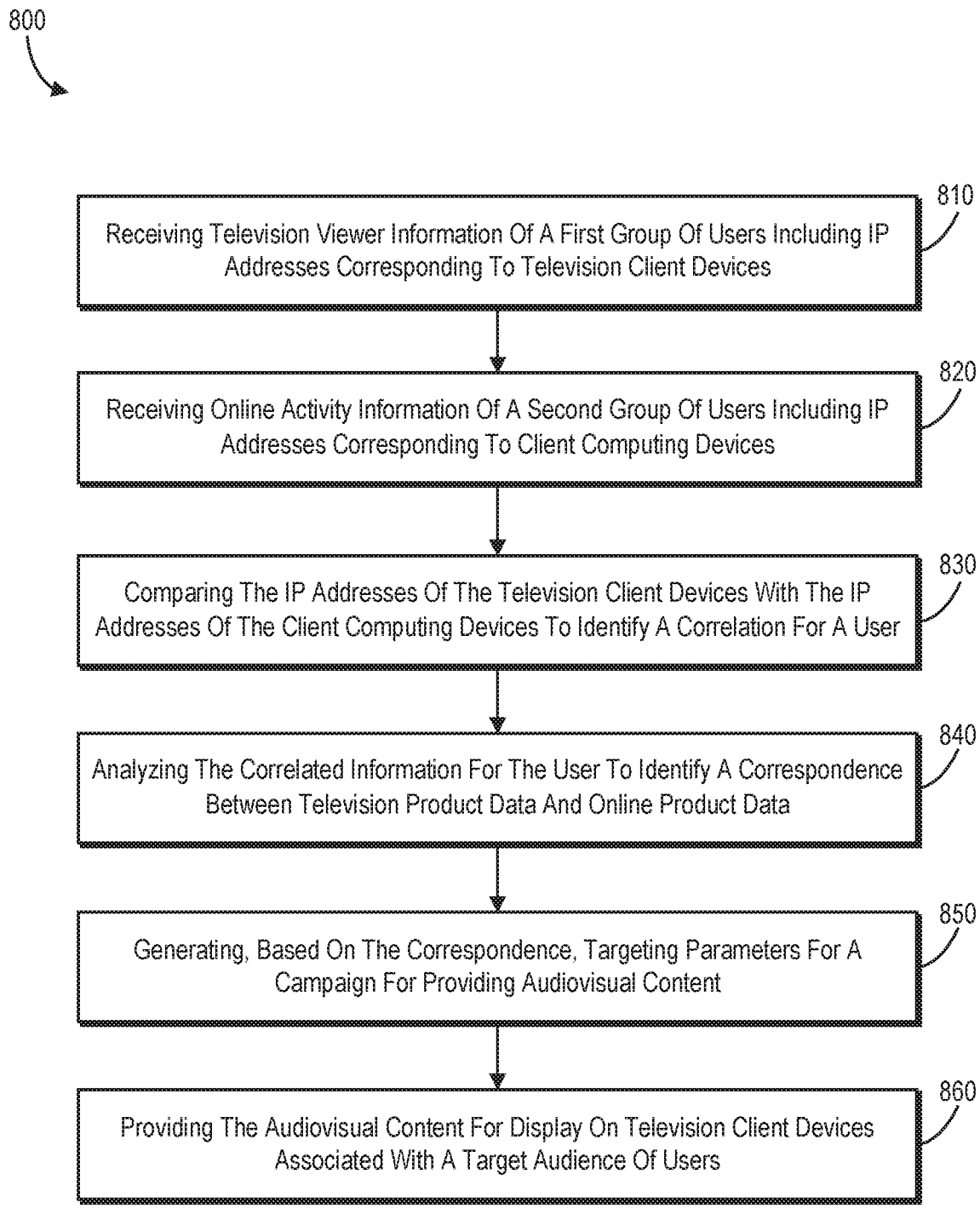
FIG. 8 illustrates an example flow diagram of a method for serving audiovisual content via television devices in accordance with one or more embodiments.

FIG. 7 illustrates an example flow diagram of a method 700 for selecting campaign parameters for serving audiovisual content via television devices in accordance with various embodiments described herein. In one or more embodiments, the method 700 is implemented on one or more computing devices, such as a server device. Further, in some embodiments, the method 700 is implemented in a digital environment for determining campaign parameters for serving audiovisual content via television devices.

The method 700 includes an act 710 of receiving television viewer information of a first set of users. For example, the act 710 includes receiving television viewer information 124 of a first set of users, the television viewer information 124 indicating broadcasted audiovisual content portrayed via television client devices 110 associated with the first set of users and internet protocol (IP) addresses 306 corresponding to the television client devices 110. In one or more embodiments, the television viewer information of the first set of users includes device identifiers of the television client devices and/or a network gateway device associated with each television client device, where the network gateway device is assigned an IP address by an internet service provider.

Additionally, in some embodiments, the television viewer information of a user includes an advertisement portrayed via a television client device associated with the user, a television program portrayed via a television client device associated with a first user, and/or a time of operation of the television client device associated with the user. Further, in one or more embodiments, the television viewer information is received within hours (e.g., two hours), minutes (e.g., 1, 5, 10, or 15), or even seconds (e.g., less than 60) of the television client devices associated with the first set of users displaying the broadcasted audiovisual content.

The method 700 also includes an act 720 of determining online activity information of a second set of users. In particular, the act 720 can involve determining online activity information 126 of a second set of users, the online activity information indicating IP addresses 306 corresponding to client computing devices 112 associated with the second set of users. In one or more embodiments, the online activity information of a user includes a click corresponding to an online audiovisual content item via a client computing device associated with the user, portrayal of an online audiovisual content item via the client computing device associated with the user, an online purchase via the client computing device associated with the user, and/or online browser history of the user.

As shown in FIG. 7, the method 700 further includes an act 730 of identifying a correspondence between television viewer information and online activity information of a user. In particular, the act 730 can involve identifying, based on the IP addresses 306 indicated by the television viewer information 124 corresponding to the television client devices 110 and the IP addresses 306 indicated by the online activity information 126 corresponding to the client computing devices 112, a correspondence between online activity information of a first user and television viewer information of the first user. In some embodiments, the act 730 includes determining, based on the television viewer information, that a television client device associated with the first user portrayed an advertisement for a product; and determining, based on the online activity information, an online user interaction corresponding to the product via a client computing device associated with the first user.

The method 700 also includes an act 740 of generating targeting parameters based on the identified user correspondence for an audiovisual content campaign. In particular, the act 740 can involve generating, based on the online activity information of the first user and the television viewer information of the first user, targeting parameters for an audiovisual content campaign for providing audiovisual content for display to multiple television client devices. In some embodiments, generating the targeting parameters is further based on the determination that the television client device associated with the first user portrayed the advertisement of the product and the determination of the online user interaction corresponding to the product via the client computing device associated with the first user.

The method 700 can also include additional acts. In one or more embodiments, the method 700 includes the acts of storing television viewer information of the first set of users and online activity information of the second set of users in a composite database 300, where generating the targeting parameters for the audiovisual content campaign is further based on the stored information maintained in the composite database for the first user; receiving additional online activity information that includes an IP address; determining, based on the stored information in the composite database, that the IP address correlates to the first user; and supplementing the stored information of the first user within the composite database based on the IP address correlating to the first user.

In one or more embodiments, the method 700 includes the act of providing the audiovisual content to a television broadcaster for display to television client devices associated with the target audience of users. In some example embodiments, generating the targeting parameters includes determining the audiovisual content and a target audience of users for the audiovisual content based on the online activity information of the first user and the television viewer information of the first user. In various embodiments, the targeting parameters include a time slot during a linear television programming schedule or a television program during the linear television programming schedule for providing the audiovisual content. In some embodiments, the targeting parameters include demographic information corresponding to a target audience, a frequency for providing the audiovisual content to the target audience, or a suggested audiovisual content item.

FIG. 8 illustrates an example flow diagram of a method 800 for serving audiovisual content via television devices in accordance with various embodiments described herein. In one or more embodiments, the method 800 is implemented on one or more computing devices, such as a server device. Further, in some embodiments, the method 700 is implemented in a digital environment for determining campaign parameters for serving audiovisual content via television devices.

As shown, the method 800 includes an act 810 of receiving television viewer information of a first group of users including IP addresses corresponding to television client devices. In particular, the act 810 can include receiving television viewer information 124 of a first group of users, the television viewer information comprising internet protocol (IP) addresses 306 corresponding to television client devices 110 associated with the first group of users. In one or more embodiments, the television viewer information indicates television advertisements portrayed via the television client device associated with the first user and television programs portrayed in connection with the television advertisements.

The method 800 also includes an act 820 of receiving online activity information of a second group of users including IP addresses corresponding to client computing devices. In particular, the act 820 can involve receiving online activity information 126 of a second group of users, the online activity information 126 comprising IP addresses 306 corresponding to client computing devices 112 associated with the second group of users. In one or more embodiments, the online product data from the online activity information of the first user includes conversion information corresponding to the first user for a product.

In addition, the method 800 includes an act 830 of comparing the IP addresses of the television client devices with the IP addresses of the client computing devices to identify a correspondence for a user. In particular, the act 830 can involve comparing the IP addresses 306 of the television client devices 110 associated with the first group of users with the IP addresses 306 of the client computing devices 112 associated with the second group of users to identify television viewer information 124 of a first user that correlates to online activity information 126 of the first user.

In one or more embodiments, comparing the IP addresses includes determining a first set of timestamps for the IP addresses of the television client devices; determining a second set of timestamps for the IP addresses of the client computing devices; and filtering the television viewer information of the first group of users and the online activity information of the second group of users based on a first timestamp from the first set of timestamps aligning (e.g., being with a predefined time frame or time range of one another) with a second timestamp from the second set of timestamps.

Further, the method 800 includes an act 840 of analyzing the correlated information for the user to identify a correspondence between television product data and online activity product data. In particular, the act 840 can involve analyzing the television viewer information 124 of the first user and the online activity information 126 of the first user to identify a correspondence between television product data of the first user and online product data of the first user. In one or more embodiments, the television product data includes a television advertisement portrayed via a television client device associated with the first user for a product and the online product data from the online activity information of the first user includes conversion information corresponding to the first user for the product.

The method 800 also includes an act 850 of generating, based on the correspondence, targeting parameters for an audiovisual content campaign for providing audiovisual content. In particular, the act 850 can involve generating, based on the correspondence between the online product data of the first user and the television product data of the first user, targeting parameters for an audiovisual content campaign for providing audiovisual content for display to television client devices associated with a target audience of users. In one or more embodiments, generating the targeting parameters includes determining a television program during which the audiovisual content is to be provided based on the television viewer information of the first user and the online activity information of the first user.

In addition, the method 800 includes an act 860 of providing the audiovisual content for display on television client devices associated with a target audience of users. In particular, the act 860 can involve providing, based on the targeting parameters, the audiovisual content for display on at least one of the television client devices associated with the target audience of users. In one or more embodiments, providing the audiovisual content for display includes providing the audiovisual content for display to the at least one of the television client devices associated with the target audience of users during the television program. In some embodiments, the method 800 also includes the acts receiving additional television viewer information of the first user corresponding to a television client device associated with the first user, and analyzing the additional television viewer information to determine that the television client device associated with the first user displayed the audiovisual content.

The term "digital environment," as used herein, generally refers to an environment implemented, for example, as a stand-alone application (e.g., a personal computer or mobile application running on a computing device), as a part of an application, as a plug-in for an application, as a library function or functions, as a server device, and/or as a cloud-computing system. A digital medium environment allows the content campaign system to design and implement content campaigns.

Embodiments of the present disclosure may include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 9:
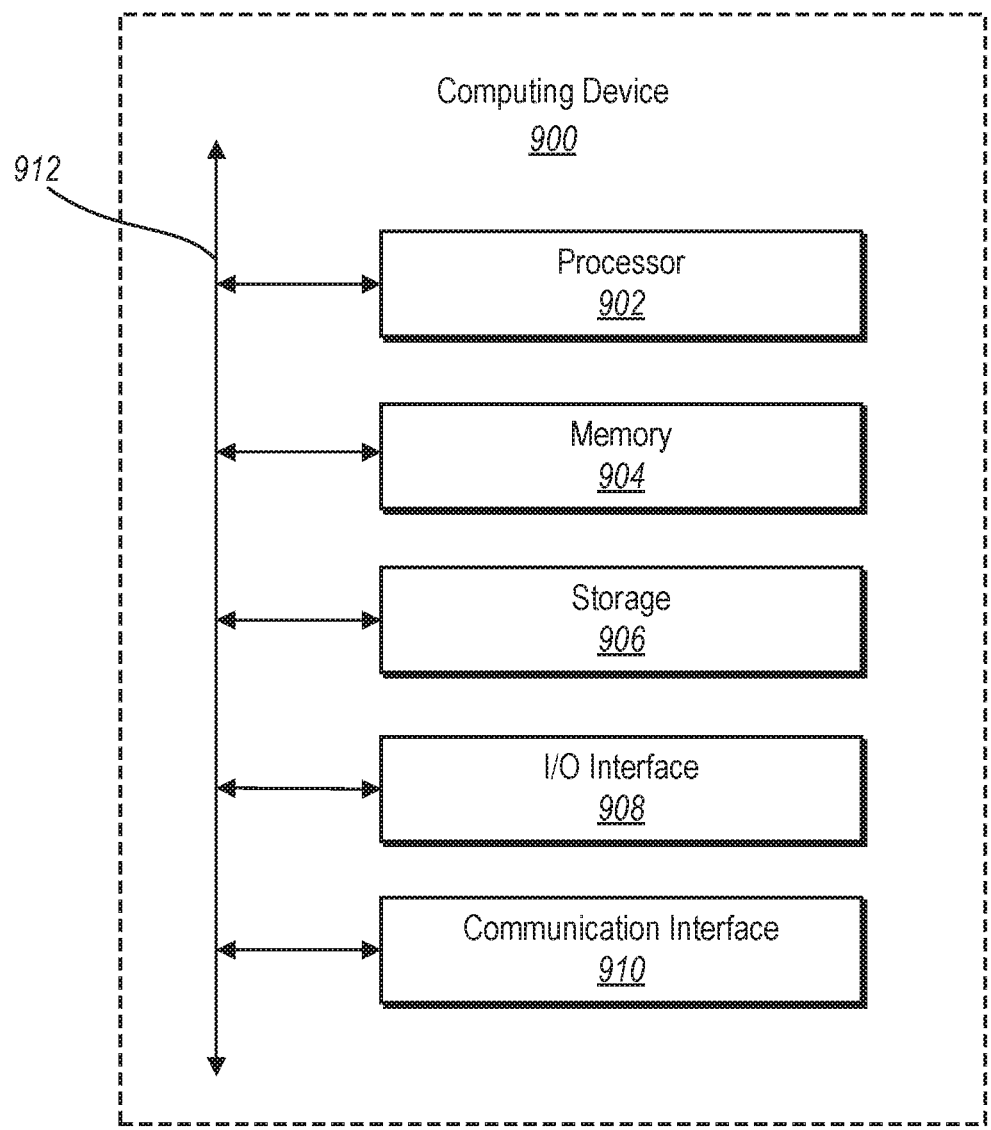
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the client devices and server devices described above. In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. The I/O interfaces 908 may include a mouse, keypad or a keyboard, a touch screen, camera, optical scanner, network interface, modem, other known I/O devices or a combination of I/O interfaces. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for designing and implementing content campaigns, a computer-implemented method for determining campaign parameters for serving audiovisual television content via television devices, the method comprising:
- identifying television viewer information of a first set of users, the television viewer information indicating a first set of internet protocol (IP) addresses corresponding to television client devices and broadcasted audiovisual content displayed on and collected by television client devices associated with the first set of users, and not collected via set-top boxes associated with the first set of users, wherein the television client devices associated with the first set of users collect the television viewer information of the first set of users based on capturing images and audio portrayed on the television client devices and monitoring television program information;
- determining online activity information of a second set of users, the online activity information indicating a second set of IP addresses corresponding to client computing devices associated with the second set of users;
- comparing the first set of IP addresses indicated by the television viewer information corresponding to the television client devices and the second set of IP addresses indicated by the online activity information corresponding to the client computing devices;
- determining, based on the comparison between the first set of IP addresses indicated by the television viewer information and the second set of IP address indicated by the online activity information, a correspondence between television viewer information of a first user and online activity information of the first user;
- identifying, based on the correspondence between the television viewer information of the first user and the online activity information of the first user, television product data of the first user that correlates with online product data of the first user; and
- automatically generating, without user input and based on identifying the television product data of the first user that correlates with the online product data of the first user, targeting parameters for a linear television programming campaign for providing audiovisual content for display to multiple television client devices corresponding to users at different households, wherein the targeting parameters for the linear television programming campaign comprise audiovisual content and a target audience of users for the audiovisual content based on the online activity information of the first user and the television viewer information of the first user.

2. The method of claim 1, wherein the television client devices associated with the first set of users collect the television viewer information from multiple sources providing content for display on the television client devices.

3. The method of claim 2, wherein the multiple sources comprise two or more of a cable source, a satellite source, a terrestrial source, a streaming source, a gaming source, or a media-playback source.

4. The method of claim 1, further comprising parsing the television viewer information of the first set of users to identify the first set of IP addresses corresponding to television client devices associated with the first set of users.

5. The method of claim 1, wherein the targeting parameters comprise a time slot during a linear television programming schedule and a television program during a linear television programming schedule for providing the audiovisual content.

6. The method of claim 1, wherein the television viewer information of the first set of users is received from a television manufacturer associated with the television client devices associated with the first set of users.

7. The method of claim 1, wherein the television viewer information is received within ten minutes of the television client devices associated with the first set of users displaying the broadcasted audiovisual content.

8. The method of claim 1, wherein:
- determining the correspondence between the online activity information of the first user and the television viewer information of the first user further comprises:
  - determining, based on the television viewer information, that a television client device associated with the first user portrayed an advertisement for a product; and
  - determining, based on the online activity information, an online user interaction corresponding to the product via a client computing device associated with the first user; and
- generating the targeting parameters is further based on the determination that the television client device associated with the first user portrayed the advertisement of the product and the determination of the online user interaction corresponding to the product via the client computing device associated with the first user.

9. The method of claim 1, further comprising:
- storing the television viewer information of the first set of users and the online activity information of the second set of users in a composite database, wherein generating the targeting parameters for the campaign is further based on the stored information maintained in the composite database for the first user;
- receiving additional online activity information that comprises an IP address;
- determining, based on the stored information in the composite database, that the IP address correlates to the first user;
- supplementing the stored information of the first user within the composite database based on the IP address correlating to the first user; and
- providing the audiovisual content to a television broadcaster for di splay to television client devices associated with the target audience of users.

10. A system for determining campaign parameters for serving audiovisual television content via television devices, the system comprising:
- a memory that includes:
  - television viewer information of a first set of users, the television viewer information indicating a first set of internet protocol (IP) addresses corresponding to television client devices and broadcasted audiovisual content displayed on television client devices associated with the first set of users, and not collected via set-top boxes associated with the first set of users, wherein the television client devices associated with the first set of users collect the television viewer information of the first set of users based on capturing images and audio portrayed on the television client devices and monitoring television program information; and
  - online activity information of a second set of users, the online activity information indicating a second set of IP addresses corresponding to client computing devices associated with the second set of users, wherein the client computing devices are distinct devices from television devices;

at least one computing device communicatively coupled to the memory and storing instructions thereon, that, when executed by the at least one computing device, cause the system to:
compare the first set of IP addresses indicated by the television viewer information corresponding to the television client devices and the second set of IP addresses indicated by the online activity information corresponding to the client computing devices;
determine, based on the comparison between the first set of IP addresses indicated by the television viewer information and the second set of IP address indicated by the online activity information, a correspondence between television viewer information of a first user and online activity information of the first user;
automatically generate, without user input and based on identifying the television viewer information of the first user that correlates with the online activity information of the first user, targeting parameters; and
provide, based on the targeting parameters, the audiovisual content for display via a linear television programming schedule to television client devices associated with a target audience of users corresponding to users at different households, wherein the targeting parameters for the linear television programming campaign comprise audiovisual content and the target audience of users for the audiovisual content based on the online activity information of the first user and the television viewer information of the first user.

11. The system as recited in claim 10, further comprising instructions that, when executed by the at least one computing device, cause the system to determine the correspondence between the online activity information of the first user and the television viewer information of the first user by:
determining, based on the television viewer information, that a television client device associated with the first user portrayed an advertisement for a product; and
determining, based on the online activity information, an online user interaction corresponding to the product via a client computing device associated with the first user.

12. The system as recited in claim 10, wherein:
the online activity information of the first user comprises at least one of a click corresponding to an online audiovisual content item via a client computing device associated with the first user, portrayal of an online audiovisual content item via the client computing device associated with the first user, an online purchase via the client computing device associated with the first user, or online browser history of the first user; and
the television viewer information of the first user comprises at least one of an advertisement portrayed via a television client device associated with the first user; a television program portrayed via the television client device associated with the first user; or a time of operation of the television client device associated with the first user.

13. The system as recited in claim 10, wherein:
the linear television programming schedule comprises pre-scheduled television programs and one or more pre-scheduled advertisements selected for a pre-scheduled future time on a target broadcast channel and for a particular geographical region; and
an advertisement of the one or more advertisements within the linear television programming schedule is based on the targeting parameters.

14. The system as recited in claim 10, wherein the targeting parameters comprise at least one of a time slot during a linear television programming schedule or a television program during the linear television programming schedule for providing the audiovisual content.

15. The system as recited in claim 14, wherein the targeting parameters comprise at least one of demographic information corresponding to the target audience, a frequency for providing the audiovisual content to the target audience, a geographic location, or a suggested audiovisual content item.

16. A non-transitory computer-readable medium storing instructions thereon that, when executed by at least one processor, cause a computer system with the at least one processor to:
identify television viewer information of a first set of users, the television viewer information indicating a first set of internet protocol (IP) addresses corresponding to television client devices and broadcasted audiovisual content displayed on and collected by television client devices associated with the first set of users, and not collected via set-top boxes associated with the first set of users, wherein the television client devices associated with the first set of users collect the television viewer information of the first set of users based on capturing images and audio portrayed on the television client devices and monitoring television program information;
determine online activity information of a second set of users, the online activity information indicating a second set of IP addresses corresponding to client computing devices associated with the second set of users, wherein the client computing devices are distinct devices from television devices;
compare the first set of IP addresses indicated by the television viewer information and the second set of IP address indicated by the online activity information corresponding to the client computing devices;
determine, based on comparison between the first set of IP addresses indicated by the television viewer information corresponding to the television client devices and the second set of IP addresses indicated by the online activity information, a correspondence between television viewer information of a first user and online activity information of the first user;
identify, based on the correspondence between the television viewer information of the first user and the online activity information of the first user, television product data of the first user that correlates with online product data of the first user; and
automatically generate, without user input and based on identifying the television product data of the first user that correlates with the online product data of the first user, targeting parameters for a linear television programming campaign for providing audiovisual content for display to multiple television client devices corresponding to users at different households, wherein the targeting parameters for the linear television programming campaign comprise audiovisual content and a target audience of users for the audiovisual content based on the online activity information of the first user and the television viewer information of the first user.

17. The non-transitory computer-readable medium of claim 16, wherein the television client devices associated with the first set of users analyzes the captured images and audio utilizing automated content recognition to identify the audiovisual content being portrayed.

18. The non-transitory computer-readable medium of claim 16, wherein:

the online activity information of the first user comprises at least one of a click corresponding to an online audiovisual content item via a client computing device associated with the first user, portrayal of an online audiovisual content item via the client computing device associated with the first user, an online purchase via the client computing device associated with the first user, or online browser history of the first user; and the television viewer information of the first user comprises at least one of an advertisement portrayed via a television client device associated with the first user, a television program portrayed via the television client device associated with the first user, or a time of operation of the television client device associated with the first user.

19. The non-transitory computer-readable medium of claim 16, wherein:

the targeting parameters comprise a time slot during a linear television programming schedule, a television program, and a broadcasting channel during a linear television programming schedule for providing the audiovisual content; and the targeting parameters comprise at least one of demographic information corresponding to the target audience, a frequency for providing the audiovisual content to the target audience, or a suggested audiovisual content item.

20. The non-transitory computer-readable medium of claim 16, wherein the television viewer information is received in real-time upon the television client devices associated with the first set of users detecting the broadcasted audiovisual content being displayed.

* * * * *